(12) United States Patent
Meador et al.

(10) Patent No.: US 8,974,903 B2
(45) Date of Patent: Mar. 10, 2015

(54) POROUS CROSS-LINKED POLYIMIDE-UREA NETWORKS

(71) Applicant: Ohio Aerospace Institute, Brook Park, OH (US)

(72) Inventors: Mary Ann B. Meador, Strongsville, OH (US); Baochau N. Nguyen, North Royalton, OH (US)

(73) Assignees: Ohio Aerospace Institute, Brook Park, OH (US); The United States of America, represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/804,546

(22) Filed: Mar. 14, 2013

(65) Prior Publication Data

US 2014/0272358 A1 Sep. 18, 2014

(51) Int. Cl.
*C08G 63/00* (2006.01)
*C08G 18/38* (2006.01)
(Continued)

(52) U.S. Cl.
CPC .............. *C08G 73/1046* (2013.01); *C08J 9/00* (2013.01); *C08G 18/6438* (2013.01); *C08J 9/28* (2013.01);
(Continued)

(58) Field of Classification Search
CPC ............... C08G 2101/0091; C08G 73/1035; C08G 73/1067; C08G 18/6438; C08J 9/00; C08J 9/28; C08J 2201/026; C08J 2201/0542; C08J 2203/06; C08J 2203/08; C08J 2205/026; C08J 2379/02
USPC .............. 428/216, 375; 528/179, 185, 183
See application file for complete search history.

(56) References Cited

U.S. PATENT DOCUMENTS

| 6,084,000 A * | 7/2000 | Weiser et al. .................. 521/54 |
| 7,074,880 B2 | 7/2006 | Rhine et al. |
| 8,394,492 B1 | 3/2013 | Leventis et al. |

FOREIGN PATENT DOCUMENTS

| EP | 0987294 A1 | 3/2000 |
| EP | 2058347 A1 | 5/2009 |
| WO | 2004/009673 A1 | 1/2004 |

OTHER PUBLICATIONS

Meador et al., "Mechanically Strong, Flexible Polyimide Aerogels Cross-Linked with Aromatic Triamine", Appl. Mater. Interfaces, 2012, 4, 536-544.*

(Continued)

*Primary Examiner* — Prashant J Khatri
*Assistant Examiner* — Travis Figg
(74) *Attorney, Agent, or Firm* — Pearne & Gordon LLP

(57) ABSTRACT

Porous cross-linked polyimide-urea networks are provided. The networks comprise a subunit comprising two anhydride end-capped polyamic acid oligomers in direct connection via a urea linkage. The oligomers (a) each comprise a repeating unit of a dianhydride and a diamine and a terminal anhydride group and (b) are formulated with 2 to 15 of the repeating units. The subunit was formed by reaction of the diamine and a diisocyanate to form a diamine-urea linkage-diamine group, followed by reaction of the diamine-urea linkage-diamine group with the dianhydride and the diamine to form the subunit. The subunit has been cross-linked via a cross-linking agent, comprising three or more amine groups, at a balanced stoichiometry of the amine groups to the terminal anhydride groups. The subunit has been chemically imidized to yield the porous cross-linked polyimide-urea network. Also provided are wet gels, aerogels, and thin films comprising the networks, and methods of making the networks.

34 Claims, 14 Drawing Sheets
(3 of 14 Drawing Sheet(s) Filed in Color)

Scheme 6:

(51) Int. Cl.
*C08G 18/18* (2006.01)
*C08G 65/38* (2006.01)
*B32B 7/02* (2006.01)
*D02G 3/00* (2006.01)
*C08G 73/10* (2006.01)
*C08J 9/00* (2006.01)
*C08G 18/64* (2006.01)
*C08J 9/28* (2006.01)

(52) U.S. Cl.
CPC ....... *C08G 73/1035* (2013.01); *C08J 2201/026* (2013.01); *C08J 2201/0542* (2013.01); *C08J 2203/06* (2013.01); *C08J 2203/08* (2013.01); *C08J 2205/026* (2013.01); *C08J 2379/02* (2013.01)
USPC ........... 428/375; 528/179; 528/185; 528/183; 521/128; 521/180; 521/115; 428/216

(56) References Cited

OTHER PUBLICATIONS

Katti et al. "Chemical, Physical, and Mechanical Characterization of Isocyanate Cross-linked Amine-Modified Silica Aerogels", 2006, Chem. Mater., 18, 285-296.*
Boday, D.J. et al., "Strong, Low-Density Nanocomposites by Chemical Vapor Deposition and Polymerization of Cyanoacrylates on Aminated Silica Aerogels," ACS Applied Materials & Interfaces, 2009, vol. 1, No. 7, pp. 1364-1369.
Braun, R.D. and Manning, R.M., "Mars Exploration Entry, Descent, and Landing Challenges," Journal of Spacecraft and Rockets, Mar.-Apr. 2007, vol. 44, No. 2, pp. 310-323.
Capadona, L.A. et al., "Flexible, low-density polymer crosslinked silica aerogels," Polymer, 2006, vol. 47, pp. 5754-5761.
Chidambareswarapattar, C. et al., "One-step room-temperature synthesis of fibrous polyimide aerogels from anhydrides and isocyanates and conversion to isomorphic carbons," J. Mater. Chem., Nov. 2010, vol. 20, pp. 9666-9678.
Chuang, K.C. et al., "High Flow Addition Curing Polyimides," Journal of Polymer Science: Part A: Polymer Chemistry, 1994, vol. 32, pp. 1341-1350.
Fesmire, J.E., "Aerogel insulation systems for space launch applications," Cryogenics, 2006, vol. 46, pp. 111-117.
Guo, H. et al., "Elastic low density aerogels derived from bis[3-(triethoxysilyl)propyl]disulfide, tetramethylorthosilicate and vinyltrimethoxysilane via a two-step process," Journal of Materials Chemistry, 2009, vol. 19, pp. 9054-9062.
Guo, H. et al., "Polyimide Aerogels Cross-Linked through Amine Functionalized Polyoligomeric Silsesquioxane," ACS Applied Materials & Interfaces, Feb. 4, 2011, vol. 3, pp. 546-552.
Guo, H. et al., "Tailoring Properties of Cross-Linked Polyimide Aerogels for Better Moisture Resistance, Flexibility, and Strength," ACS Applied Materials & Interfaces, Sep. 6, 2012, vol. 4, pp. 5422-5429.
Hergenrother, P.M., "The Use, Design, Synthesis, and Properties of High Performance/High Temperature Polymers: an Overview," High Performance Polymers, 2003, vol. 15, pp. coverpage, 3-45.
Husing, N. and Schubert, U., "Aerogels—Airy Materials: Chemistry, Structure, and Properties," Angew. Chem. Int. Ed., 1998, vol. 37, pp. coverpage, 23-45.
Ilhan, U.F. et al., "Hydrophobic monolithic aerogels by nanocasting polystyrene on amine-modified silica," J. Mater. Chem., 2006, vol. 16, pp. 3046-3054.
Jensen, B.J., "Modified phenylethynyl terminated polyimides with lower melt viscosity," Polymer Preprints, Aug. 1996, p. 222.

Jones, S.M., "Aerogel: Space exploration applications," J Sol-Gel Sci Techn, 2006, vol. 40, pp. 351-357.
Kawagishi, K. et al., "Superior Nanoporous Polyimides via Supercritical CO2 Drying of Jungle-Gym-Type Polyimide Gels," Macromolecular Rapid Communications, 2007, vol. 28, pp. 96-100.
Meador, M.A., "Recent Advances in the Development of Processable High-Temperature Polymers," Annu. Rev. Mater. Sci., 1998, vol. 28, pp. 599-630.
Meador, M.A.B. et al., "Cross-linking Amine-Modified Silica Aerogels with Epoxies: Mechanically Strong Lightweight Porous Materials," Chem. Mater., 2005, vol. 17, No. 5, pp. 1085-1098.
Meador, M.A.B. et al., "Structure-Property Relationships in Porous 3D Nanostructures as a Function of Preparation Conditions: Isocyanate Cross-Linked Silica Aerogels," Chem. Mater., 2007, vol. 19, No. 9, pp. 2247-2260.
Meador, M.A.B. et al., "Structure-Property Relationships in Porous 3D Nanostructures: Epoxy-Cross-Linked Silica Aerogels Produced Using Ethanol as the Solvent," ACS Applied Materials and Interfaces, 2009, vol. 1, No. 4, pp. 894-906.
Meador, M.A.B. et al., "Epoxy Reinforced Aerogels Made Using a Streamlined Process," ACS Applied Materials & Interfaces, Jun. 30, 2010, vol. 2, No. 7, pp. 2162-2168.
Meador, M.A.B. et al., "Synthesis and Properties of Nanoporous Polyimide Aerogels Having a Covalently Bonded Network Structure," Polymer Preprints, 2010, vol. 51, No. 1, pp. 265-266.
Meador, M.A.B. et al., "Mechanically Strong, Flexible Polyimide Aerogels Cross-Linked with Aromatic Triamine," ACS Applied Materials and Interfaces, Jan. 10, 2012, vol. 4, pp. 536-544.
Mulik, S. et al., "Cross-Linking 3D Assemblies of Nanoparticles into Mechanically Strong Aerogels by Surface-Initiated Free-Radical Polymerization," Chem. Mater., 2008, vol. 20, pp. 5035-5046.
Nguyen, B.N., "Development of Processable PMR-Type Polyimides for High Temperature Applications," Ph.D. Thesis, University of Akron, Dec. 2000, 224 pages.
Nguyen, B.N. et al., "Tailoring Elastic Properties of Silica Aerogels Cross-Linked with Polystyrene," ACS Applied Materials & Interfaces, 2009, vol. 1, No. 3, pp. 621-630.
Nguyen, B.N. et al., "Elastic Behavior of Methyltrimethoxysilane Based Aerogels Reinforced with Tri-Isocyanate," ACS Applied Materials & Interfaces, 2010, vol. 2, No. 5, pp. 1430-1443.
Pierre, A.C. and Pajonk, G.M., "Chemistry of Aerogels and Their Applications," Chem. Rev., 2002, vol. 102, No. 11, pp. 4243-4265.
Randall, J.P. et al., "Tailoring Mechanical Properties of Aerogels for Aerospace Applications," ACS Applied Materials and Interfaces, Mar. 1, 2011, vol. 3, pp. 613-626.
Reza, S. et al., "Aerocapture Inflatable Decelerator (AID) for Planetary Entry," Paper No. AIAA 2007-2516,19th AIAA Aerodynamic Decelerator Systems Technology Conference and Seminar, May 21, 2007, Williamsburg, Virginia; American Institute of Aeronautics and Astronautics, Reston, Virginia, 2007, pp. 1-18.
Serafini, T.T. et al., "Thermally Stable Polyimides from Solutions of Monomeric Reactants," Journal of Applied Polymer Science, 1972, vol. 16, pp. 905-915.
Utracki, L.A. et al., "Synthetic, layered nanoparticles for polymeric nanocomposites (PNCs)," Polymers for Advanced Technologies, 2007, vol. 18, pp. 1-37.
Vivod, S.L. et al., "Di-isocyanate cross-linked silica aerogels with hexyl links incorporated into the underlying silica backbone," Polymer Preprints, 2009, vol. 50, No. 1, pp. 119-120.
Zhang, G. et al., "Isocyanate-crosslinked silica aerogel monoliths: preparation and characterization," Journal of Non-Crystalline Solids, 2004, vol. 350, pp. 152-164.
International Search Report and Written Opinion for related PCT/US2014/024298, European Patent Office as ISA, mailed Nov. 18, 2014, pp. 1-11.

* cited by examiner

Scheme 3:

Scheme 4:

Scheme 5:

Scheme 6:

Scheme 7:

wherein, R and R' can be, independently, for example, a phenyl ring.

a) branched PI, 1% STN
$\rho = 0.096$ g/cm$^3$, 4.1 % shrinkage, 93 % porosity, 486 m$^2$/g b) branched PI, 2% STN
$\rho = 0.11$ g/cm$^3$, 5.9 % shrinkage, 92 % porosity, 487 m$^2$/g c) PI-PU, 2% STN
$\rho = 0.18$ g/cm$^3$, 19.4 % shrinkage, 88 % porosity, 456 m$^2$/g a) Thermal imidization b) Chemical imidization a)          b)          c)

a)          b)

a)

b)

a)

b)

a)

b)

POROUS CROSS-LINKED POLYIMIDE-UREA NETWORKS

STATEMENT OF GOVERNMENT-SPONSORED RESEARCH

This invention was made with government support under Contract No. NNC07BA13B awarded by NASA. The government has certain rights in this invention.

FIELD OF THE INVENTION

The present invention relates generally to polyimide-urea networks, and more particularly, to porous cross-linked polyimide-urea networks.

BACKGROUND OF THE INVENTION

Thermosetting polyimides are commercially available as uncured resins, stock shapes, thin sheets, laminates, and machines parts. Thermoplastic polyimides are very often called pseudothermoplastic. There are two general types of polyimides. One type, so-called linear polyimides, is made by combining imides into long chains. Aromatic heterocyclic polyimides are the other usual kind, where R' and R" are two carbon atoms of an aromatic ring. Examples of polyimide films include Apical, Kapton, UPILEX, VTEC PI, Norton TH and Kaptrex. Polyimides have been in mass production since 1955. Typical monomers include pyromellitic dianhydride and 4,4'-oxydianiline.

Lightweight, low density structures are desired for acoustic and thermal insulation for aerospace structures, habitats, and astronaut equipment and aeronautic applications. Aerogel is a manufactured material with the lowest bulk density of any known porous solid. It is derived from a gel in which the liquid component of the gel has been replaced with a gas. The result is an extremely low-density solid with several properties, most notably its effectiveness as a thermal insulator and its extremely low density. It is nicknamed frozen smoke, solid smoke, or blue smoke due to its translucent nature and the way light scatters in the material; however, it feels like expanded polystyrene to the touch. Aerogels are produced by extracting the liquid component of a gel through supercritical drying. This allows the liquid to be slowly drawn off without causing the solid matrix in the gel to collapse from capillary action, as would happen with conventional evaporation. The first aerogels were produced from silica gels.

Plain silica aerogels are brittle. Reinforcing the aerogel structure with polymer provides improvements in strength while maintaining low density and pore structure. Degradation of polymers used in cross-linking tend to limit use temperatures to below 150° C.

Polyimide aerogels can be fabricated from linear polyimides by allowing a low concentration polyimide/polyamic acid solution to gel, followed by heating to complete imidization and subsequent supercritical fluid extraction, as taught for example by Wendall, R., et al., WO/2004/009673, and Chidambareswarapattar, C., et. al., J. Mater. Chem. 2010, 20, 9666-9678. Polyimide aerogels prepared in this way from, for example, oxydianiline and pyrolimellitic dianhydride, have high surface areas, low density, low thermal conductivity, and good ductility. However, the gels shrink substantially, up to 40%, during supercritical fluid extraction.

Polyimide aerogels can also be synthesized by reaction of dianhydrides with diisocyanates instead of diamines, as also reported by Chidambareswarapattar, C., et. al., J. Mater. Chem. 2010, 20, 9666-9678. This approach resulted in less shrinkage if gels were allowed to cure at room temperature, but results of thermogravimetric analyses of these aerogels revealed that imidization had not gone to completion.

Polyimide aerogels can also be synthesized by cross-linking anhydride end-capped polyamic acid oligomers via aromatic triamines, followed by thermal imidization, as taught for example by Kawagishi, K., et al., Macromol. Rapid Commun. 2007, 28, 96-100, and Meador, M. A. B., et al., Polym. Prepr. 2010, 51, 265-266. Unfortunately, the thermal imidization caused the gels to re-dissolve to some extent, suggesting hydrolysis of amic acid and disruption of the integrity of the polyimide aerogel network.

Polyimide aerogels can also be synthesized by imidization of polyamic acid oligomers at room temperature with the use of pyridine/acetic anhydride (Py/AA), as taught for example by Guo, H, et al., Appl. Mater. Interfaces, 2011, 3, 546, and Meador, M. A. B., et al., Appl. Mater. Interfaces, 2012, 4, 536. In these studies, use of a multifunctional amine monomer such as octa(aminophenyl)silsequioxane (OAPS) as a cross-linker provided flexible polyimide aerogels films, and aerogels derived from different diamines and dianhydrides yielded polyimide aerogels exhibiting a range of physical and mechanical properties.

BRIEF SUMMARY OF THE INVENTION

A porous cross-linked polyimide-urea network is provided. The network comprises a subunit comprising two anhydride end-capped polyamic acid oligomers in direct connection via a urea linkage. The oligomers (a) each comprise a repeating unit of a dianhydride and a diamine and a terminal anhydride group and (b) are formulated with 2 to 15 of the repeating units. The subunit was formed by reaction of the diamine and a diisocyanate to form a diamine-urea linkage-diamine group, followed by reaction of the diamine-urea linkage-diamine group with the dianhydride and the diamine to form the subunit. The subunit has been cross-linked via a cross-linking agent, comprising three or more amine groups, at a balanced stoichiometry of the amine groups to the terminal anhydride groups. The subunit has been chemically imidized to yield the porous cross-linked polyimide-urea network.

Also provided is a method of making a porous cross-linked polyimide-urea network comprising a subunit comprising two anhydride end-capped polyamic acid oligomers in direct connection via a urea linkage. The oligomers (a) each comprise a repeating unit of a dianhydride and a diamine and a terminal anhydride group and (b) are formulated with 2 to 15 of the repeating units. The method comprises reacting the diamine and a diisocyanate to form a diamine-urea linkage-diamine group. The method also comprises reacting the diamine-urea linkage-diamine group with the dianhydride and the diamine to form the subunit. The method also comprises cross-linking the subunit with a cross-linking agent, comprising three or more amine groups, at a balanced stoichiometry of the amine groups to the terminal anhydrides. The method also comprises chemically imidizing the subunit with an imidization catalyst to yield the porous cross-linked polyimide-urea network.

Also provided is a porous cross-linked polyimide-urea aerogel. The aerogel comprises a cross-linked and imidized subunit comprising two anhydride end-capped polyamic acid oligomers in direct connection via a urea linkage. The oligomers (a) each comprise a repeating unit of a dianhydride and a diamine and a terminal anhydride group and (b) are formulated with 2 to 15 of the repeating units. The aerogel has a density of 0.18 to 0.21 g/cm$^3$ and a Young's modulus of 10 to 40 MPa.

Also provided is a thin film comprising a porous cross-linked polyimide-urea aerogel. The aerogel comprises a cross-linked and imidized subunit comprising two anhydride end-capped polyamic acid oligomers in direct connection via a urea linkage. The oligomers (a) each comprise a repeating unit of a dianhydride and a diamine and a terminal anhydride group and (b) are formulated with 2 to 15 of the repeating units. The aerogel has a density of 0.18 to 0.21 g/cm$^3$ and a Young's modulus of 10 to 40 MPa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
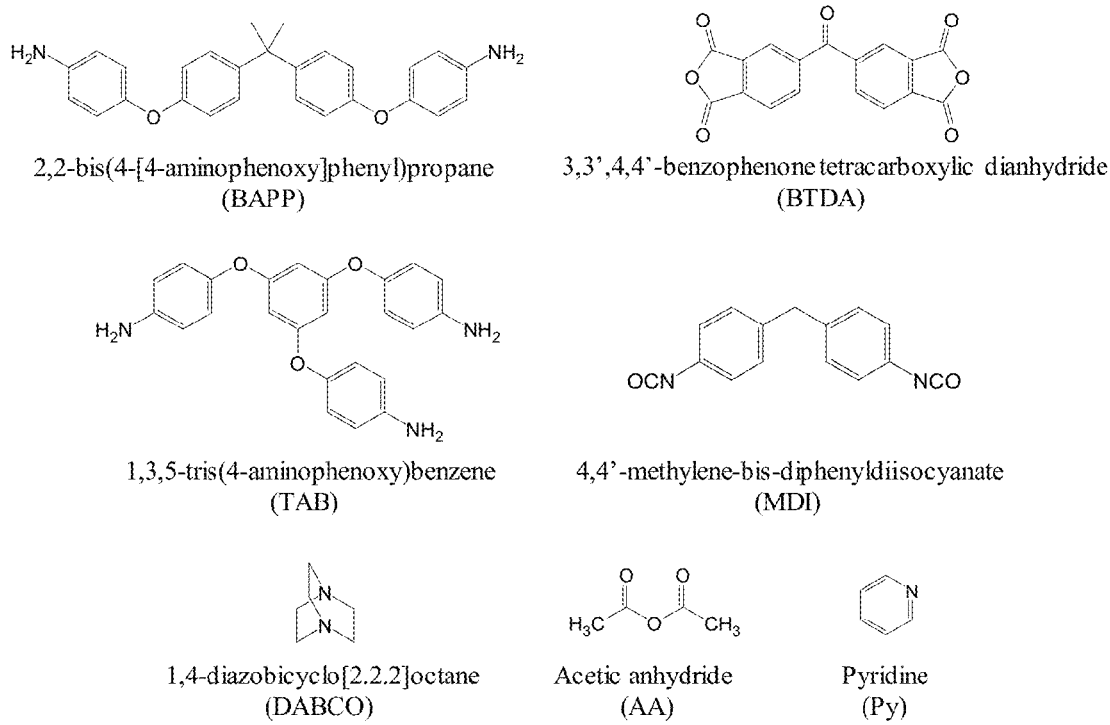
FIG. 1 shows Scheme 1, corresponding to chemical structures of various precursors and catalysts.

Described herein are porous cross-linked polyimide-urea networks, and aerogels and thin films comprising the networks. A porous cross-linked polyimide-urea network can be formed by reaction of a diamine and a diisocyanate to form a diamine-urea linkage-diamine group, followed by reaction of the diamine-urea linkage-diamine group with a dianhydride and the diamine to form a subunit comprising two anhydride end-capped polyamic acid oligomers in direct connection via the urea linkage. The subunit can then be cross-linked via a cross-linking agent and chemically imidized to yield the porous cross-linked polyimide-urea network. Without wishing to be bound by theory, it is believed that by creating the diamine-urea linkage-diamine group prior to forming the polyamic acid oligomers of the subunit that potential side reactions involving a diisocyanate, which is used to make the urea linkage, and polyamic acid oligomers and imidization catalyst are avoided. It is also believed that the urea linkage of the polyimide-urea network provides additional flexibility relative to corresponding polyimide networks lacking the urea linkage, enabling uniform mixing of the subunit, cross-linking agent, and the imidization catalyst and thus formation of a uniform porous cross-linked polyimide-urea network. The resulting porous cross-linked polyimide-urea networks can be used to make aerogels having a density of 0.18 to 0.21 g/cm$^3$, a porosity of 80 to 90%, and/or a Young's modulus of 10 to 40 MPa, as well as thin films having sufficient flexibility to be rolled or folded and then recover completely without cracking or flaking and/or a tensile strength at yield of 1.0 to 3.5 MPa.

In one embodiment, a porous cross-linked polyimide-urea network is provided. The network comprises a subunit comprising two anhydride end-capped polyamic acid oligomers in direct connection via a urea linkage. By this it is meant that the network is made from molecules comprising two polyamic acid oligomers that are in direct connection with each other via a urea linkage, wherein each of the oligomers is end-capped with an anhydride group.

Each oligomer comprises a repeating unit of a dianhydride and a diamine. A variety of dianhydrides and diamines can be used. For example, the dianhydride can be selected from the group consisting of benzophenone-3,3',4,4'-tetracarboxylic dianhydride ("BTDA"), 2,2'-bis(3,4'-dicarboxyphenyl) hexafluoropropane dianhydride ("6FDA"), and biphenyl-3, 3',4,4'-tetracarboxylic dianhydride ("BPDA"). Also for example, the diamine can be selected from the group consisting of 2,2'-bis[4-(4-aminophenoxy)phenyl]propane ("BAPP"), 3,4'-oxydianiline ("3,4'-ODA"), 4,4'-oxydianiline ("4,4'-ODA"), p-phenylene diamine ("PPDA"), 2,2'-dimethylbenzidine ("DMBZ"), bisaniline-p-xylidene ("BAX"), 4,4'-bis(4-aminophenoxy)biphenyl ("4,4'-BAPB"), 3,3'-bis (4-aminophenoxy)biphenyl ("3,3'-BAPB"), 4,4'-(1,4-phenylenediisopropylidene)bisaniline ("BisP"), and 4,4'-(1,3-phenylenediisopropylidene)bisaniline ("BisM"). The dianhydride and/or diamine can be selected based on being readily available, e.g. commercially available. The dianhydride and/or diamine can also be selected based on being known to impart different properties to polyimides in general, e.g. BPDA, PPDA, and DMBZ are known to produce a relatively rigid backbone in polyimide structures, whereas ODA, 6FDA, and BTDA have flexible linking groups between phenyl rings resulting in less rigid structures.

Two or more dianhydrides and/or two or more diamines can also be used in combination. For example, a diamine known to produce a rigid backbone in polyimides in general, such as PPDA or DMBZ, can be used in combination with a diamine having flexible linking groups between phenyl rings, such as ODA, to tailor properties of the resulting porous cross-linked polyimide-urea network. Thus, for example, the diamine can comprise (i) ODA and (ii) PPDA or DMBZ. In accordance with this example, PPDA and ODA can be used in combination, such that the mole percent of PPDA can be varied from 0% to 100% of the total diamine, e.g. from 20% to 80%, 30% to 70%, 40% to 60%, or at about 50%, with the remaining diamine corresponding to ODA, e.g. from 80% to 20%, 70% to 30%, 60% to 40%, or at about 50%. Also in accordance with this example, DMBZ and ODA can be used in combination, such that the mole percent of DMBZ can be varied from 0% to 100% of the total diamine, e.g. from 20% to 80%, 30% to 70%, 40% to 60%, or at about 50%, with the remaining diamine corresponding to ODA, e.g. from 80% to 20%, 70% to 30%, 60% to 40%, or at about 50%.

Each oligomer also comprises a terminal anhydride group, i.e. each oligomer has an anhydride group at one end thereof, accounting for the anhydride end-capping noted above.

The oligomers are formulated with 2 to 15 of the repeating units. In some examples, the oligomers can be formulated with 4 to 9, or 5 to 7, or 6 of the repeating units.

The subunit was formed by reaction of the diamine and a diisocyanate to form a diamine-urea linkage-diamine group, followed by reaction of the diamine-urea linkage-diamine group with the dianhydride and the diamine to form the subunit. The diisocyanate can be, for example, 4,4'-methylene-bis-diphenyldiisocyanate ("MDI"). The reaction of the diamine and the diisocyanate to form the diamine-urea linkage-diamine group can be carried out with an excess of diamine to isocyanate groups of the diisocyanate in order to ensure amine-end capping of all of the isocyanate groups thereof.

The reaction of the resulting diamine-urea linkage-diamine group with the dianhydride and the diamine to form the subunit can then be carried out by adding the dianhydride in order to form and extend polyamic acid oligomers, one from each of the two isocyanate groups of each molecule of diisocyanate.

This reaction can be carried out such that there is a balanced stoichiometry of both the diamine and the dianhydride that has been added. As one of ordinary skill will appreciate, carrying out the reaction at a balanced stoichiometry of the diamine and the dianhydride results in extension of polyamic acid oligomers from the diamine-urea linkage-diamine groups, with each polyamic acid oligomer comprising a terminal anhydride group, i.e. being anhydride end-capped. As one of ordinary skill will also appreciate, a balanced stoichiometry need not be precisely balanced with respect to the molar ratio, but rather can tolerate some variation, e.g. plus or minus 10%, so long as most, e.g. essentially all, of the resulting polyamic acid oligomers comprise a terminal anhydride group.

This reaction can also be carried out at a predetermined molar ratio of resulting repeating units of the dianhydride and the diamine to the isocyanate groups of each molecule of diisocyanate. As one of ordinary skill will appreciate, carrying out the reaction at a predetermined molar ratio of the resulting repeating units to the isocyanate groups allows control of the number of repeating units with which the resulting anhydride end-capped polyamic acid oligomers are formulated. For example, by carrying out the reaction at a predetermined molar ratio of 6 of the repeating units per isocyanate group, the resulting anhydride end-capped polyamic acid oligomers will have an average of 6 of the repeating units. This can be accomplished, for example, by adding a total of 6 molar equivalents of the diamine and 6 molar equivalents of the dianhydride per isocyanate group, with the diamine and diisocyanate first being combined in a single composition to react and form the diamine-urea linkage-diamine group, followed by addition of the dianhydride, resulting in reaction of the dianhydride with remaining excess diamine to form and extend the polyamic acid oligomers, one from each of the two isocyanate groups of each molecule of diisocyanate. Moreover, by carrying out the reaction at a higher predetermined molar ratio, e.g. 7, 8, 9, 10, 11, 12, 13, 14, or 15, the resulting anhydride end-capped polyamic acid oligomers can have a higher average number of the repeating units, e.g. 7, 8, 9, 10, 11, 12, 13, 14, or 15, respectively. In addition, by carrying out the reaction at a lower predetermined molar ratio, e.g. 5, 4, 3, or 2, the resulting anhydride end-capped polyamic acid oligomers can have a lower average number of the repeating units, e.g. 5, 4, 3, or 2, respectively.

Conditions suitable for these reactions are known in the art. Exemplary suitable conditions are provided in the Examples below.

The subunit has been cross-linked via a cross-linking agent. By this it is meant that molecules of the subunit have been cross-linked to each other via the cross-linking agent. The cross-linking agent comprises three or more amine groups. For example, the cross-linking agent can be selected from the group consisting of a triamine, an aliphatic triamine, an aromatic triamine, 1,3,5-tri(4-aminophenoxy)benzene ("TAB"), a silica cage structure (otherwise known as a silsesquioxane cage structure) decorated with three or more amines, octa(aminophenyl)silsesquioxane ("OAPS"), octa (aminophenyl)silsesquioxane as a mixture of isomers having the ratio meta:ortho:para of 60:30:10, and para-octa(aminophenyl)silsesquioxane ("p-OAPS").

The cross-linking is carried out at a balanced stoichiometry of the amine groups of the cross-linking agent to the terminal anhydrides of the oligomer. For example, for a cross-linking agent comprising three amine groups and a subunit comprising two oligomers, each oligomer comprising a terminal anhydride group, in order to obtain a precisely balanced stoichiometry the molar ratio of the cross-linking agent to the subunit would be 2:3. As one of ordinary skill in the art will appreciate, carrying out the cross-linking at a balanced stoichiometry provides a cross-linked gel. This is in contrast to an imbalanced stoichiometry, which provides comb polymers that probably would not gel. Accordingly, as one of ordinary skill will also appreciate, a balanced stoichiometry need not be precisely balanced with respect to the molar ratio, but rather can tolerate some variation, e.g. plus or minus 10%, so long as the cross-linking provides a cross-linked gel. Conditions suitable for the cross-linking are known in the art.

The subunit also has been chemically imidized to yield the porous cross-linked polyimide-urea network. The chemical imidization can be carried out, for example, by use of an imidization catalyst. The imidization catalyst can comprise, for example, acetic anhydride and pyridine. The subunit can be chemically imidized to completion, e.g. all of the amic acid groups of each repeating unit of the oligomers of the subunit can have reacted, e.g. intra-molecularly, to yield imide units. The subunit also can be chemically imidized without using thermal imidization, e.g. without using an increase in temperature during imidization in order to increase the rate of imidization. For example, the subunit can be chemically imidized at a temperature below 100° C., e.g. below 80° C., below 60° C., or below 40° C. Also for example, the subunit can be chemically imidized at room temperature, e.g. at 15° C. to 25° C., 18° C. to 22° C., or 20° C. By first cross-linking the subunit to form a cross-linked gel, followed by chemically imidizing the subunit, the porous cross-linked polyimide-urea network is formed. Conditions suitable for the chemical imidization are known in the art.

In accordance with the above-noted embodiment, also provided is a wet gel comprising the porous cross-linked polyimide-urea network. Along with the network, the wet gel can comprise a solvent that was used for preparation of the network. Solvents that can be used for preparation of the network include, for example, N-methyl-2-pyrrolidinone ("NMP"), dimethylformamide ("DMF"), and dimethylacetamide ("DMAc").

Alternatively or additionally, the wet gel can comprise a solvent used to remove the solvent that was used for preparation of the network. Such solvents include, for example, acetone, acetonitrile, ethyl acetate, or ethanol.

In accordance with the above-noted embodiment, also provided is an aerogel comprising the porous cross-linked polyimide-urea network. The aerogel can be obtained, for example, by supercritical fluid extraction, e.g. supercritical $CO_2$ extraction.

The aerogel can have a low density, e.g. 0.18 to 0.21 $g/cm^3$. The aerogel can have a high porosity, e.g. a porosity of 80 to 90%. The aerogel can have a Young's modulus of 10 to 40 MPa. The weight loss of the aerogel following heating of the network at 310° C. can be less than 10%.

In accordance with the above-noted embodiment, also provided is a thin film comprising the porous cross-linked polyimide-urea network. The oligomer of the network can be formulated with, e.g., 4 to 9, 5 to 7, or 6 of the repeating units. The thin film can have sufficient flexibility to be rolled or folded and then recover completely without cracking or flaking. The thin film can have a tensile strength at yield of 1.0 to 3.5 MPa.

In another embodiment, a method of making a porous cross-linked polyimide-urea network comprising a subunit comprising two anhydride end-capped polyamic acid oligomers in direct connection via a urea linkage. The oligomers (a) each comprise a repeating unit of a dianhydride and a diamine and a terminal anhydride group, and (b) are formulated with 2 to 15 of the repeating units. Again, a variety of dianhydrides and diamines can be used, as discussed above, and the oligomer of the network can be formulated with, e.g., 4 to 9, 5 to 7, or 6 of the repeating units.

The method comprises reacting (i) the diamine and a diisocyanate to form a diamine-urea linkage-diamine group, (ii) reacting the diamine-urea linkage-diamine group with the dianhydride and the diamine to form the subunit, (iii) cross-linking the subunit with a cross-linking agent, comprising three or more amine groups, at a balanced stoichiometry of the amine groups to the terminal anhydrides, and (iv) chemically imidizing the subunit with an imidization catalyst to yield the porous cross-linked polyimide-urea network, all as discussed above. Again, the cross-linking agent can be selected from the group consisting of a triamine, an aliphatic triamine, an aromatic triamine, 1,3,5-tri(4-aminophenoxy) benzene, a silica cage structure decorated with three or more amines, octa(aminophenyl)silsesquioxane, octa(aminophenyl)silsesquioxane as a mixture of isomers having the ratio meta:ortho:para of 60:30:10, and para-octa(aminophenyl) silsesquioxane. The subunit can be chemically imidized to completion, and/or the imidization catalyst can comprise, for example, acetic anhydride and pyridine, as discussed above.

In accordance with this embodiment, also provided is a porous cross-linked polyimide-urea network formed by the above-described method, including the disclosed variations thereof. Also provided are a wet gel, an aerogel, and a thin film, each comprising the network.

In another embodiment, a porous cross-linked polyimide-urea aerogel is provided. The aerogel comprises a cross-linked and imidized subunit comprising two anhydride end-capped polyamic acid oligomers in direct connection via a urea linkage, as discussed above. The oligomers (a) each comprise a repeating unit of a dianhydride and a diamine and a terminal anhydride group and (b) are formulated with 2 to 15 of the repeating units, as discussed above. The aerogel has a density of 0.18 to 0.21 $g/cm^3$ and a Young's modulus of 10 to 40 MPa, as discussed above.

In an example of the porous cross-linked polyimide-urea aerogel, the dianhydride is benzophenone-3,3',4,4'-tetracarboxylic dianhydride, and the diamine is 2,2'-bis[4-(4-aminophenoxy)phenyl]propane. In another example of the porous cross-linked polyimide-urea aerogel, the aerogel has a porosity of 80 to 90%. In another example of the porous cross-linked polyimide-urea aerogel, the aerogel has a BET surface area of 350 to 500 $m^2/g$. In another example of the porous cross-linked polyimide-urea aerogel, the weight loss of the aerogel following heating of the network at 310° C. is less than 10%.

In another embodiment, a thin film comprising a porous cross-linked polyimide-urea aerogel is provided. The aerogel comprises a cross-linked and imidized subunit comprising two anhydride end-capped polyamic acid oligomers in direct connection via a urea linkage, as discussed above. The oligomers (a) each comprise a repeating unit of a dianhydride and a diamine and a terminal anhydride group and (b) are formulated with 2 to 15 of the repeating units, as discussed above. The aerogel has a density of 0.18 to 0.21 $g/cm^3$ and a Young's modulus of 10 to 40 MPa, as discussed above.

In an example of the thin film comprising a porous cross-linked polyimide-urea aerogel, the thin film has sufficient flexibility to be rolled or folded and then recovers completely without cracking or flaking. In another example, the thin film has a tensile strength at yield of 1.0 to 3.5 MPa.

EXAMPLE

Development of porous cross-linked polyimide-urea networks is carried out in this study. Using 1,3,5-tri(4-aminophenoxy)benzene ("TAB") as a core to generate branching composed of 2,2'-bis[4-(4-aminophenoxy)phenyl]propane ("BAPP") and 3,3',4,4'-benzophenone tetracarboxylic dianhydride ("BTDA"), three-dimensional networks were completed with the addition of a diisocyanate, 4,4'-methylene-bis-diphenyldiisocyanate ("MDI"). The urea linkages, formed from reaction of MDI with the amine from BAPP, were to provide additional flexibility in combination with the flexible linkages obtained from BAPP and TAB to the final products. The polyimide-urea ("PI-PU") aerogels were prepared via both thermal and chemical imidization processes. In the thermal imidization process, amine-capped branched polyimides ("PIs") were first synthesized, then subsequently cured by MDI. In the chemical imidization reaction, MDI was pre-capped with BAPP, which then further reacted with BTDA, followed by TAB, to complete the cross-linked systems. Aerogel monoliths and aerogel thin films from selected formulations prepared from both routes were molded and cast, and their physical and mechanical properties, as well as their characteristics were evaluated, compared, and discussed. Inclusion of Lucentite STN was also examined with thermal imidization. Lucentite STN clay is a fully synthetic and exfoliated Hectorite having hydroxyl groups at the edges of the clay layers, as discussed by Utracki, L. A. et al., Polymers for Advanced Technologies 2007, 18, 1. Being highly soluble in several solvents including NMP is another attractive property of the clay that is well suitable to be used in this study. The formation of hydrogen bonding between the —OH group from the clay and the amine and/or urea groups supported and reinforced the aerogel network, as well as resisting collapse of nano-pores during the supercritical drying process.

Experimental Section

Figure 2:
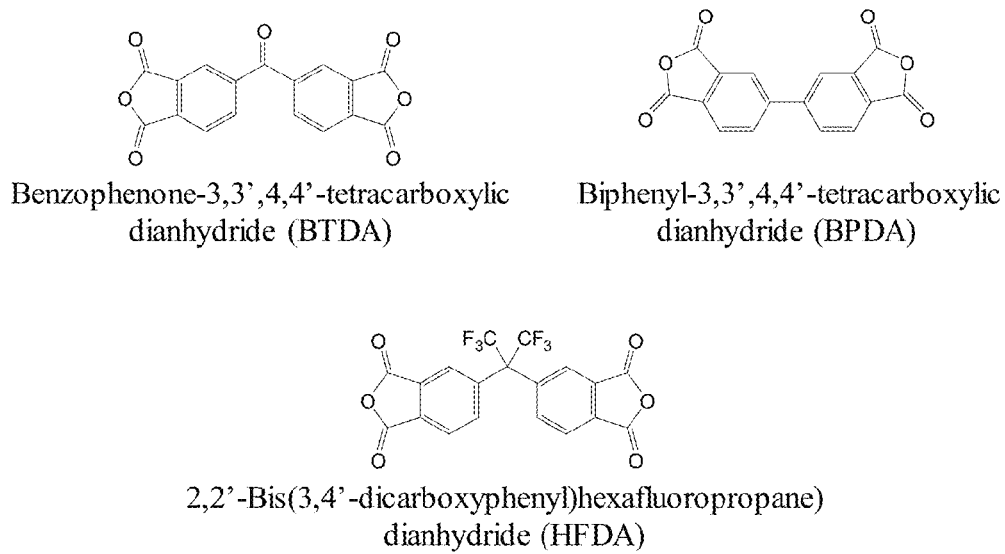
FIG. 2 shows Scheme 2, corresponding to exemplary dianhydrides.
Figure 3:
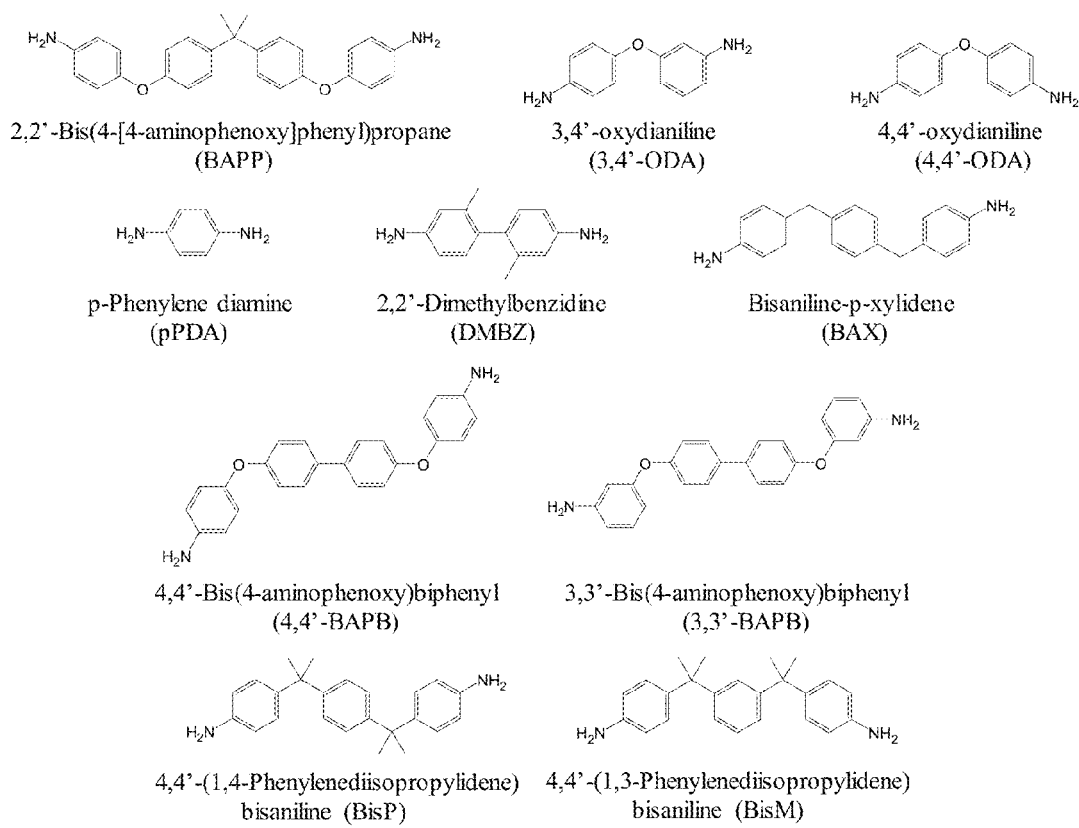
FIG. 3 shows Scheme 3, corresponding to exemplary diamines.

Materials. Precursors 3,3',4,4'-benzophenone tetracarboxylic dianhydride (BTDA) and 2,2'-bis(4-[4-aminophenoxy]phenyl)propane (BAPP) were purchased from Chrikev Company, Inc. and Wakayama Seika Kogya Com., Lmt., respectively; 1,3,5-tri(4-aminophenoxy)benzene (TAB) was custom made by Oakwood Chemical; and 4,4'-methylene-bis-diphenyldiisocyanate (MDI) was provided by Bayer. N-methyl-2-pyrrolidinone ("NMP", HPLC grade) was obtained from Tedia; acetone (HPLC grade) was from Pharmco-AAPER; and liquid carbon dioxide was from Air Gas. Catalysts used including 1,4-diazabicyclo[2.2.2]octane ("DABCO"), acetic anhydride ("AA"), and pyridine ("Py") were purchased from Aldrich. BTDA was vacuum dried at 140° C. before use. Chemical structures of the precursors and catalysts are shown in Scheme 1 (FIG. 1), exemplary dianhydrides are shown in Scheme 2 (FIG. 2), and exemplary diamines are shown in Scheme 3 (FIG. 3). Lucentite STN clay was provided by COOP chemical in Japan.

Synthesis (Scheme 4).

All of the PI-based aerogels were formulated at 10 w/w % total solution. The repeating unit was formulated based on the length of each of the polyimide segments. For the branched PIs, as shown in Scheme 4 (FIG. 4), linear polyamic acid ("PAA") with a formulated number of repeating units n of 3, with respect to the repeating unit, was prepared, followed by the addition of TAB, then thermal imidization or chemical imidization.

Figure 5:
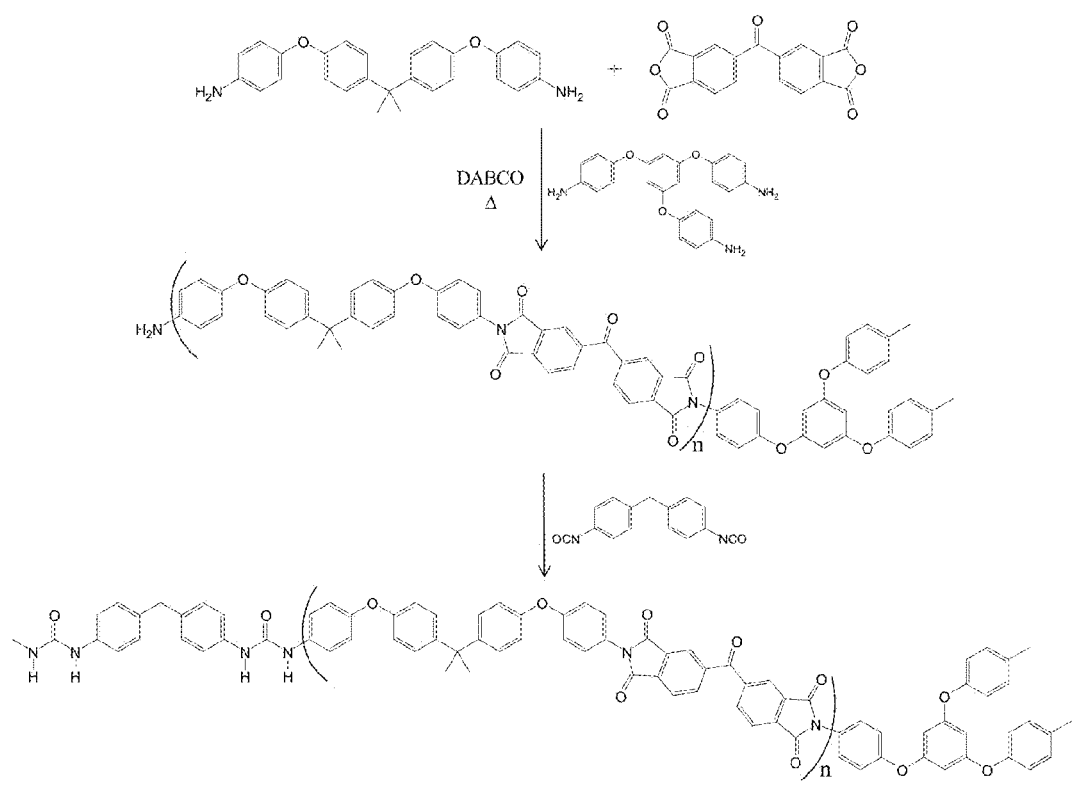
FIG. 5 shows Scheme 5, corresponding to general synthetic routes for polyimide-urea ("PI-PU") aerogels via thermal imidization (method 1).

In the thermal imidization process, the cross-linked (also termed "X-linked") PI-PUs required 2 steps ("method 1"). First, the branched PAAs were prepared, then thermally imidized. The three-dimensional network was then completed with the addition of the diisocyanate, MDI, as shown in Scheme 5 (FIG. 5). MDI, in this method, acted as a cross-linker that connected all the PI branches together. The final solution was then processed into cylindrical monoliths or thin film. The incorporation of smectite clay, when appropriate, was added to the branched polyimide at the same time as the diisocyanate. The level of clay added was 1-2 wt %, based on the total weight of polyimide/urea in the solution.

Figure 6:
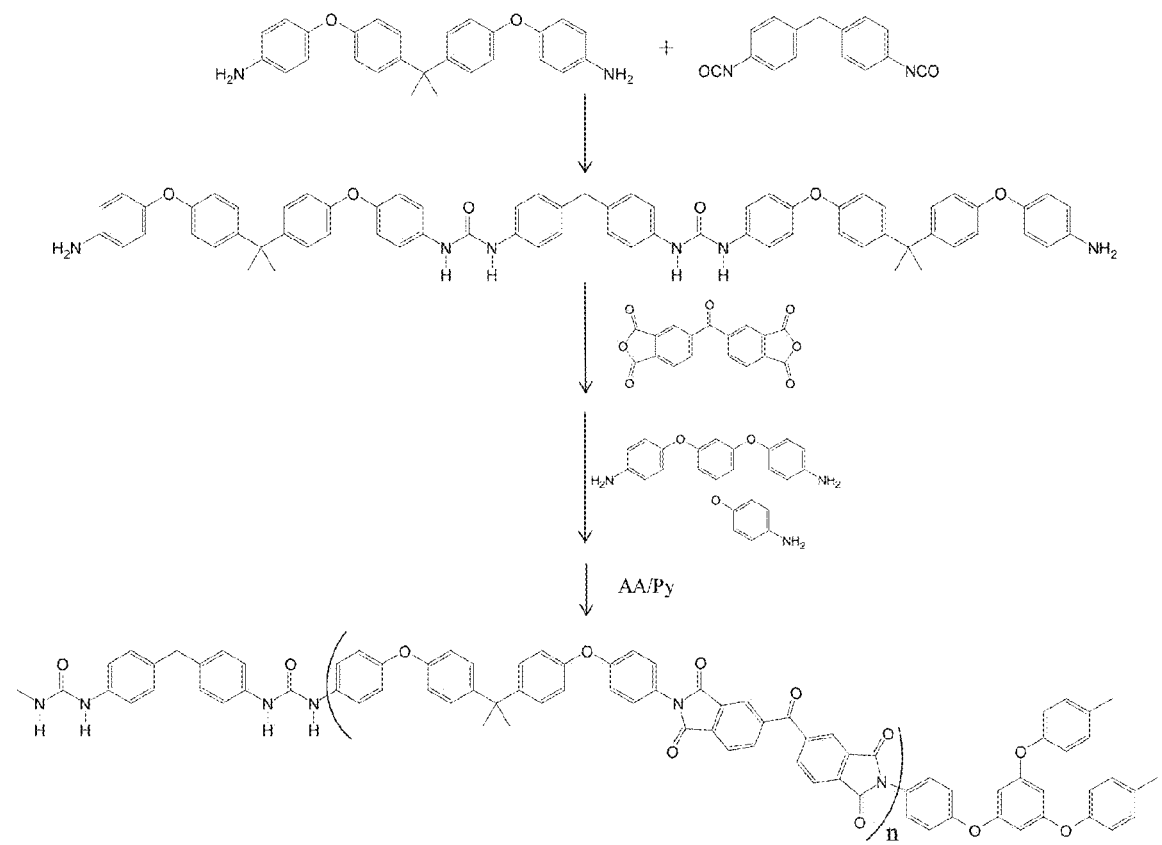
FIG. 6 shows Scheme 6, corresponding to general synthetic routes for PI-PU aerogels via chemical imidization (method 2).

In the chemical imidization process (method 2), MDI was first reacted, or capped, with BAPP, as shown in Scheme 6 (FIG. 6). BTDA was then added, with excess unreacted BAPP still present. The resulting PAA chains, extended by MDI, were reacted with TAB. The final solution was imidized chemically at room temperature with acetic anhydride and pyridine. Using this method, pre-reacting MDI with BAPP was necessary to avoid potential side effects with the PAAs, or with the AA and/or Py. In other words, the PAA chains were extended before being cross-linked with TAB.

All of the PI-based sol-gels, either monoliths or films, were aged overnight after being molded or cast. Solvent exchange to remove NMP from the gels with acetone started with 75/25% v/v of NMP/acetone, 25:75% v/v NMP/acetone, followed by 4 washes of fresh acetone. Aerogels were obtained after the solvent was extracted using liquid $CO_2$ supercritical drying process. All the gels were vacuum dried at 80° C. before being analyzed and tested.

Preparation Methods.

Method 1: Thermal Imidization Reaction

1. Branched polyimide (PI) aerogel: A typical reaction to prepare branched PI, with a formulated number of repeat units n of 3 (sample 1), is as follows. BTDA (4.35 g, 13.49 mmol) was dissolved in 51 ml NMP with a few grains of DABCO in a 120 ml jar; BAPP (5.54 g, 13.49 mmol) in 20 ml NMP and TAB (0.60 g, 1.5 mmol) in 10 ml NMP, each in separate containers. BAPP was then added to the BTDA solution, followed by TAB. After being heated to 110-115° C. for 18 hours, the polyimide solution was cooled down to about 95-100° C., then was poured into cylindrical molds which then gelled in 3 minutes. For clay reinforced PI (Samples 7 and 8), Lucentite STN was dissolved in 5 ml of NMP of the total NMP volume and was added to the solution before being poured into molds.

2. Polyimide-urea (PI-PU) aerogel: The preparation of branched PIs was similar to the procedure described above. In a 120 ml glass jar, polyimide solution with a formulated number of repeat units n of 3 (Sample 5) comprising BTDA (3.75 g, 11.6 mmol) in 31 ml NMP with a few grains of DABCO, BAPP (4.78 g, 11.6 mmol) in 20 ml NMP and TAB (0.52 g, 1.3 mmol) in 10 ml NMP. Once the thermal imidization reaction was over, the branched PI solution was allowed to cool down to about 90-100° C. MDI (1.44 g, 5.8 mmol) in 20 ml NMP was then added. The resulting polyimide/urea solution was poured into cylindrical molds or cast to thin films. Complete gelation occurred in about 4 minutes. Once gelled, cylinders/films were aged overnight, then demolded the next day. The gels were solvent exchanged with acetone, and dried using supercritical $CO_2$ extraction. To prepare the clay reinforced PI-PU aerogel (Sample 9), Lucentite STN was added to the MDI solution before being mixed with the PI solution.

Method 2: Chemical Imidization Reaction

1. Branched polyimide (PI) sol-gel: For n of 3 (Sample 10), BAPP and TAB were dissolved in NMP as follows: BAPP (5.54 g, 13.49 mmol) in 53 ml NMP, and TAB (0.60 g, 1.5 mmol) in 10 ml NMP. BTDA (4.35 g, 13.49 mmol), in powder form, was added to the BAPP solution. Once BTDA was dissolved and reacted with BAPP, TAB was added and thoroughly mixed. Acetic anhydride ("AA") (10.20 ml) and pyridine ("Py") (8.70 ml) were then added. The imidization took place at room temperature. Gelation time was greater than 2 hours.

2. Preparation of PI-PU sol-gels: For n of 3 (Sample 11), BAPP, TAB, and MDI were dissolved in NMP as follows: BAPP (5.25 g, 12.8 mmol) in 44 ml NMP, TAB(0.57 g, 1.4 mmol) and MDI (0.53 g, 2.1 mmol), each in 10 ml NMP. The solution of MDI was slowly added to the solution of BAPP with constant stirring. BTDA (4.12 g, 12.8 mmol), in powder form, was then added. Once BTDA was dissolved and reacted with BAPP, TAB was added and thoroughly mixed in, followed by AA (9.70 ml) and Py (8.30 ml). The imidization reaction took place at room temperature after the addition of pyridine. Complete gelation occurred in about 50 minutes. Thin films were cast after 20 minutes of stirring.

The resulting monoliths/films of branched PI and PI-PU gels were aged overnight, demolded, and solvent exchanged with acetone. Branched PI and PI-PU aerogels were obtained using supercritical $CO_2$ extraction.

Film Casting Procedure. The polyimide-urea solutions were prepared via methods 1 and 2. A 12 inch wide doctor blade was set with 1.092 mm (0.043 inch) gap and the solution was cast on a 0.05 inch thick oriented polyester film carrier. The casting speed depended on the viscosities of the solutions and the methods use. In method 1, casting speed was set at 400 cm/min, due to low viscosity of the solution at 90-100° C. Once MDI was mixed with the PI solution, the solution was poured into the doctor blade immediately. Complete gelation was over 4 minutes after casting. Via chemical imidization, in contrast, much slower casting speed, 80 cm/min, was applied because the solution was much more viscous after 20 minutes of stirring. Total time for gelation was 50 min after AA/Py were added.

Instrumental. The skeletal density ($\rho_s$) was measured using an Accupyc 1340 helium pycnometer. Nitrogen sorption measurements using Brunauer-Emmett-Teller (BET) method were performed on a Micromeritics ASAP2020 chemisorption system. All samples were out-gassed at 80° C. for 12 h under vacuum before analysis. Samples for microscopy were coated with gold/palladium and viewed using a Hitachi S-4700-11 field emission scanning electron microscope. Supercritical $CO_2$ fluid extraction was performed using an Applied Separations 1-Spe-ed SFE-2 manual system. Compression tests were done on an Instron 4505 electromechanical machine using TestWorks 4 software and a 10000 Newton load cell at 0.25 in/min. Tensile tests were measured on Instron 5567 machine using Bluehill software and a 100 Newton load cell at 2 mm/min.

Characterization. The bulk density ($\rho_b$) was determined by measuring the weight and volume of the sample. Dimensional change, or shrinkage (%), is taken as the difference between the diameters of the aerogel monolith and of the 20-mL syringe mold (nominally 20 mm). The skeletal density from helium pycnometry ($\rho s$) and the bulk density were used to calculate the porosity (%) of the aerogels using Eq. 1.

$$\text{Porosity \%} = \frac{1/\rho_b - 1/\rho_s}{1/\rho_b} \times 100 \tag{Eq. 1}$$

Compression tests were carried out using ASTM standard D695-02a (Compressive Properties Rigid Plastic) as a guideline and tensile tests using ASTM D882 with 5 mm and 33 mm in width and length, respectively. The Young's modulus was taken as the initial slope from the stress-strain curve of both the compression and tensile tests.

Results and Discussion

Figure 4:
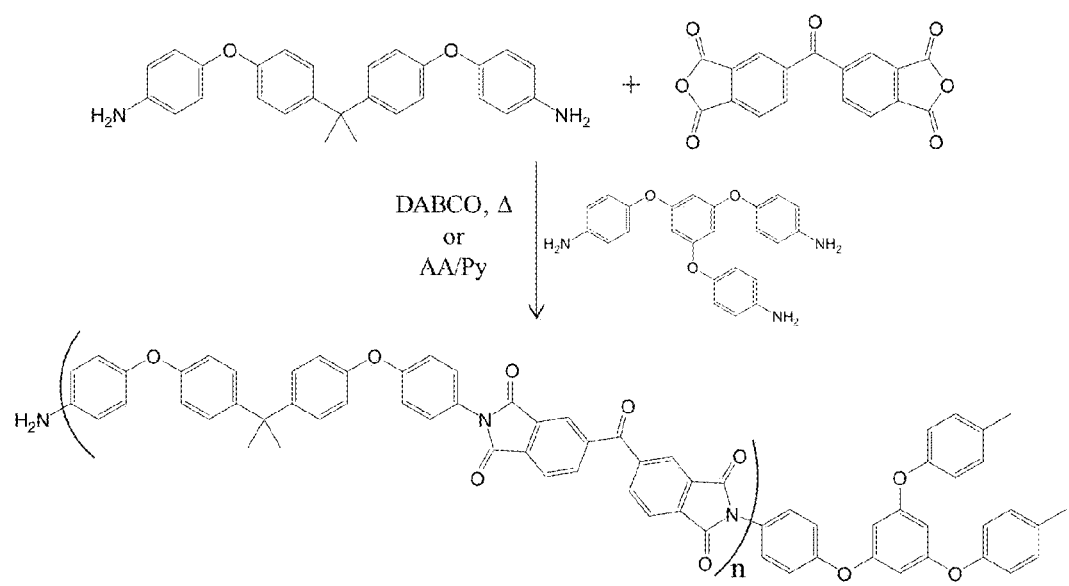
FIG. 4 shows Scheme 4, corresponding to general synthetic routes for branched polyimide aerogels.

The branched polyimides (PIs) (i.e. non-urea-cross-linked polyimides) and urea-cross-linked PIs (PI-PUs) were characterized in terms of their physical properties, including density, percent shrinkage, porosity, and surface area, as well as their mechanical properties, including compression modulus, tensile stress, and percent elongation, as shown in TABLE 1 and TABLE 2. Tensile tests were done only on cast aerogel films. For the branched (non-urea-cross-linked) PI, the formulation is shown below in Eq. 2:

$$n(\text{diamine}) + n(\text{dianhydride}) + \tfrac{1}{3}(\text{TAB}) - 2n(H_2O) = \text{total MW (g/mol)} \tag{Eq. 2}$$

where n is the formulated number of repeating units, for each polyimide chain before its reaction with TAB. A general procedure involved the addition of a TAB solution to a linear polyamic acid solution before being thermally or chemically imidized, as shown in Scheme 4 (FIG. 4).

Method 1: Thermal Imidization. Thermal imidization was carried out at 110-115° C. with the use DABCO as a catalyst for 15-18 h.

Branched PI (not Urea-Cross-Linked). Monoliths of amine-capped branched PI with n of 3 (sample 1) were prepared. Gel formed in about 3 min ($t_{gel}$) after the imide solution was removed from the oven. Vapor of water by-product was released as the temperature gradually decreased to about 95-100° C. Its physical and mechanical properties are reported in TABLE 1 (sample 1) including densities of 0.1 g/cm$^2$, 4.3% shrinkage, 93% porosity, 476 m$^2$/g BET surface area, and 4.8 MPa modulus. Although monoliths of the branched PIs with n values of 2 and 6 were prepared, their gels were weak and crumbled when they were demolded. Branched PIs with higher n values precipitated during the imidization reaction.

Figure 7:
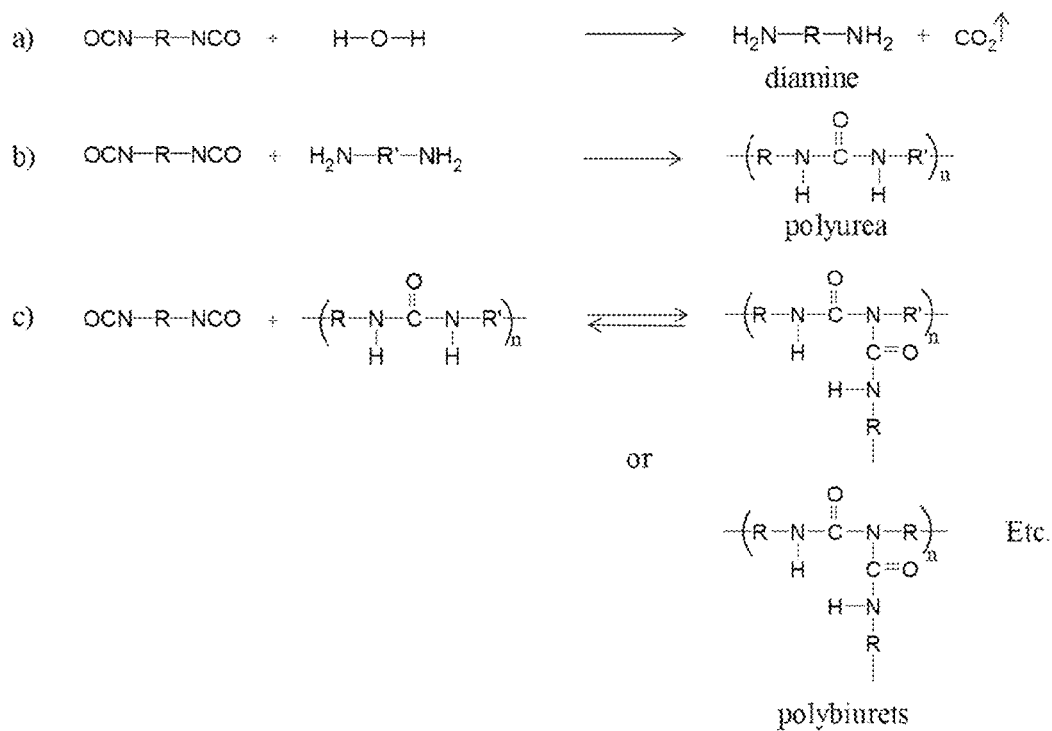
FIG. 7 shows Scheme 7, corresponding to general reaction of isocyanate with water, aromatic diamine, and side product(s). In accordance with Scheme 7, R and R' can be, independently, for example, a phenyl ring.
Figure 8:
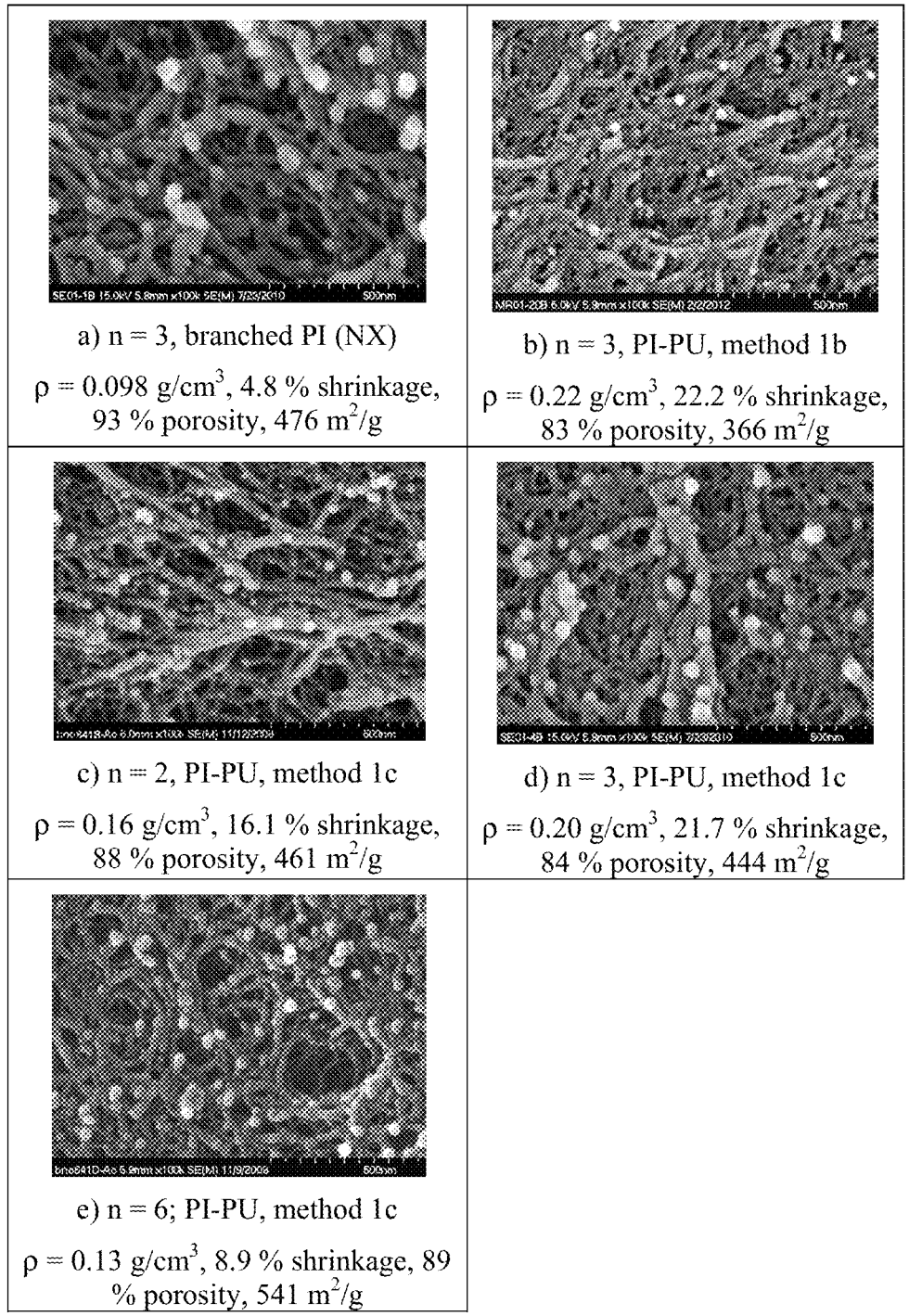
FIG. 8 shows scanning electron microscopy ("SEM") images of branched PIs and PI-PUs prepared via thermal imidization, and having the following properties (where n is the number of repeating units): (a) n=3, branched PI, $\rho$=0.098 g/cm$^3$, 4.8% shrinkage, 93% porosity, surface area of 476 m$^2$/g; (b) n=3, PI-PU, method 1b, $\rho$=0.22 g/cm$^3$, 22.2% shrinkage, 83% porosity, surface area of 366 m$^2$/g; (c) n=2, PI-PU, method 1c, $\rho$=0.16 g/cm$^3$, 16.1% shrinkage, 88% porosity, 461 m$^2$/g; (d) n=3, PI-PU, method 1c, $\rho$=0.20 g/cm$^3$, 21.7% shrinkage, 84% porosity, surface area of 444 m$^2$/g; and (e) n=6; PI-PU, method 1c, $\rho$=0.13 g/cm$^3$, 8.9% shrinkage, 89% porosity, surface area of 541 m$^2$/g.

MDI Cross-Linked PIs (PI-PUs). In this method, MDI was used as a curing agent, connecting the branches from one to another with urea linkages, as shown in Scheme 5 (FIG. 5). Based on experimental observations, three findings have been established with three different equations (Eqs. 3-5).

a. It is required 3/2 MDI for every TAB-cored branched PI to fully cross-link, as formulated in Eq. 3:

$$n(\text{diamine}) + n(\text{dianhydride}) + \tfrac{1}{3}(\text{TAB}) + \tfrac{1}{2}(\text{MDI}) - 2n(H_2O) = \text{total MW (g/mol)} \tag{Eq. 3}$$

where n is 3 (sample 2). However, an attempt to cross-link the amine-capped PI resulted in failure to gel. As formulated in Eq. 3, the amount of water released from the reaction is much more than the amount of MDI formulated to react with the amine. Shown in Scheme 7 (a-c) (FIG. 7) are reaction of a diisocyanate with water, diamine, and their side products, respectively. The reactivity of isocyanate with primary aromatic amines is 2-3 times faster (Scheme 7b) than with water (Scheme 7a) at room temperature. However, as the temperature increases, their reaction rates also increase. Water, having smaller molecular size compared to the large, bulky shape of the amine-capped branched PIs, would have higher mobility at elevated temperature (115° C.). Therefore, its reaction with MDI would be more competitive and/or more favorable. The release of bubbles after the MDI was mixed in to the PI solution was evidence of $CO_2$ generated as the by-product. Continuous reactions among the amine, water and isocyanate resulted in different side products (Scheme 7c) which may have disrupted the gelation process. It is noted that water vapor was released during the cooling time, to about 95-100° C.

b. To make up for the depletion of MDI to water, shown in Eq. 4 is a formulation from which all amine ends from branched PI and water by-product were to be reacted with MDI:

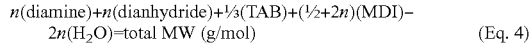

$$n(\text{diamine})+n(\text{dianhydride})+\tfrac{1}{3}(\text{TAB})+(\tfrac{1}{2}+2n)(\text{MDI})-2n(\text{H}_2\text{O})=\text{total MW (g/mol)} \quad \text{(Eq. 4)}$$

where n is 3 (sample 3). Gel formed overnight at room temperature. A long delay in gelation may have been caused by the interference of polyurea (PU) and other side products generated in the reaction. However, a three-dimensional network obtained might have been due to high degree of cross-linking. The resulting PI-PU aerogel exhibits much higher density, shrinkage and mechanical properties, and its scanning electron micrographs (SEM) (FIG. 8 (*b*)) revealed a more dense interior structure compared to the non-urea-cross-linked PI aerogel (sample 1) (FIG. 8 (*a*)). The high percent shrinkage also led to low percent porosity and BET surface area. Because of the long gelation progress, this approach was not applicable to cast thin films.

c. Side products including polyureas ("PUs") appeared to greatly affect the gelation process after MDI was added. An optimal formulation was prepared in an attempt to improve properties of the PI-PU aerogels in accordance with Eq. 5:

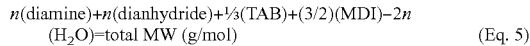

$$n(\text{diamine})+n(\text{dianhydride})+\tfrac{1}{3}(\text{TAB})+(3/2)(\text{MDI})-2n(\text{H}_2\text{O})=\text{total MW (g/mol)} \quad \text{(Eq. 5)}$$

where n equals 2, 3 or 6. Samples 4 (n=2) and 6 (n=6) gelled rapidly, within 1 to 2 min after MDI was added, entrapping a lot of $CO_2$ bubbles once gelled. Disks cast from these formulations were also brittle. Therefore, casting thin aerogel films was not applicable.

Compared to the branched polyimide (sample 1), sample 5 (n of 3) retained longer $t_{gel}$, for about 4 to 5 minutes. This longer delay of gelation supported the evidence found in the above two cases, and that PUs and other by-products generated along with the PI-PU partially affected the formation of the network. However, when compared to sample 3, the amount of MDI used was much less, and lower amounts of side products, i.e. polyureas, polybiurets, and other derivatives, were generated. This allowed sufficient time to cast a large roll of film (1' wide by 8' long). Cross-linking reaction of MDI with the branched PI enabled the system to form a strong, durable film that was also flexible and bendable. Although some flexibility was obtained using non-urea-cross-linked PIs made from BAPP and TAB, the aerogels thus obtained were easy to break and some were flaky, whereas flexibility was greatly enhanced by urea linkages in corresponding PI-PU aerogels.

In a further attempt to improve physical and mechanical properties of the PI-PU thin film aerogel, inclusion of a synthetic organophilic smectite clay, Lucentite STN, was investigated. The clay is fully exfoliated as received and is well dispersed in NMP. The STN clay, having hydroxyl groups on the edge of clay plates, was added at the last step to avoid hydrogen bonding with the amic acid. Listed in TABLE 1, Samples 7-9, are the final physical and mechanical properties of the branched PI and cross-linked PI-PU aerogels with and without STN clay. Under the SEM (FIG. 9 (*a-c*)), agglomeration of clay was seen, due to hydrogen bonding between the hydroxyl groups and amine ends, or urea bonds.

Method 2: Chemical Imidization. With the interference of the water by-product incurred in method 1, chemical imidization was examined as an alternative route, using pyridine and acetic anhydride as catalysts. The mole ratio of Py/AA to the n value was kept constant at 8:8:1. Eqs. 2 and 5 were applied for non-urea-cross-linked and urea-cross-linked aerogels, respectively. In this approach, MDI was pre-reacted with BAPP, having amine ends which further reacted with BTDA. The polyimide chain segments, formulated with different n values, were extended via urea linkages before the addition of TAB. The reaction of MDI with BAPP in the first addition sequence of monomers was to avoid potential side effects that would have been caused by the amic acid, acetic anhydride, and pyridine. A series of PI-PU aerogels with polyimide segments having a formulated number of repeating units n of 3, 6, 9, 12 and 15 were prepared (Samples 11-15). All gelled in 50 minutes after the catalyst, pyridine, was added. As for the non-urea-cross-linked PIs, only n of 3 (sample 10) was evaluated. Its gelation occurred over 2 hours.

Physical and Mechanical Properties. As shown in TABLE 1 and TABLE 2, branched PI aerogels prepared from both thermal and chemical imidization reactions (samples 1 and 10) exhibited similar physical properties including relatively low density and shrinkage (dimensional change) as well as high percent porosity and BET surface area. However, there was a big difference in their $t_{gel}$ values. In the thermal reaction, a complete imidization was achieved with gelation complete before cooling to room temperature. Using the chemical approach, the amic acid was slowly imidized over a period of time. Generally, the compressive modulus is a function of density and/or shrinkage of the aerogels. However, it was found that much higher (nearly 2 times) modulus was obtained for the PI aerogel, prepared via thermal reaction.

Figure 10:
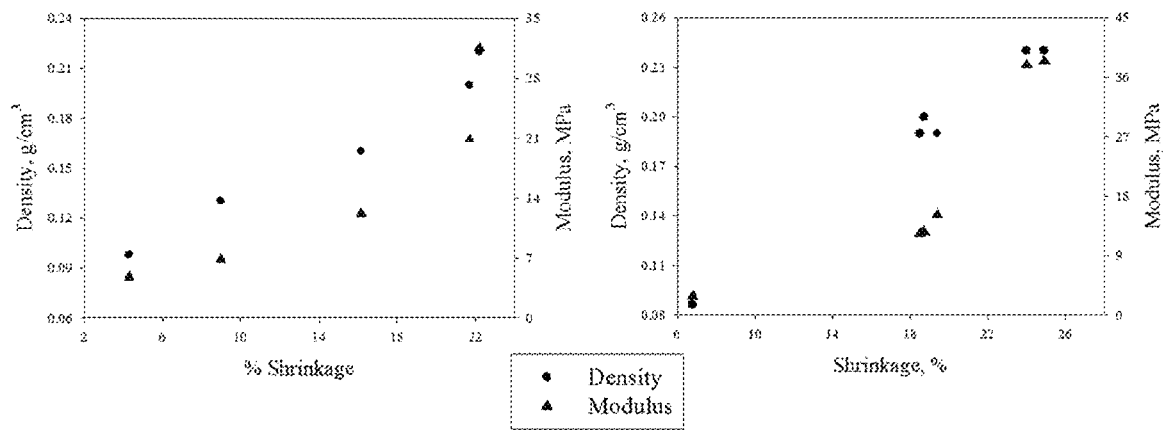
FIG. 10 illustrates density and modulus as functions of shrinkage for PI-PU aerogels made as follows: (a) thermal imidization; and (b) chemical imidization.

With the connection of the diisocyanate with the PI chains, the PI-PU aerogels exhibited much higher density and shrinkage than the non-urea-cross-linked PIs. The urea linkages were the cause for the pores to collapse. It was observed that there was a correlation between the physical and mechanical properties of the PI-PU aerogels, and that higher shrinkage related to higher density and higher modulus (FIG. 10 (*a, b*)). Excess MDI also led to higher shrinkage when comparing properties of samples with n of 3 (samples 3, 5 and 11), as reported in TABLE 1 and TABLE 2. Between the thermal and chemical imidization methods, the by-products from the side reactions of MDI with water and other urea derivatives as generated during thermal imidization were found to more greatly affect the properties of the final materials.

Among all of the aerogels prepared via the thermal process, the formulation for sample 5 was found to be the best, with good physical and mechanical properties, as well as the ability to be cast into thin films. Compared to sample 3, improved physical properties obtained from sample 5 showed a lower density, lower shrinkage, and thus lower modulus, with higher percent porosity and BET surface area. Also, SEM imaging indicated a less dense structure for sample 5 (FIG. 8 (*d*)) than for sample 3 (FIG. 8 (*b*)). At higher n values (FIG. 8 (*e*)), the morphology appeared to be similar to the branched PI (FIG. 8 (*a*)).

Figure 9:
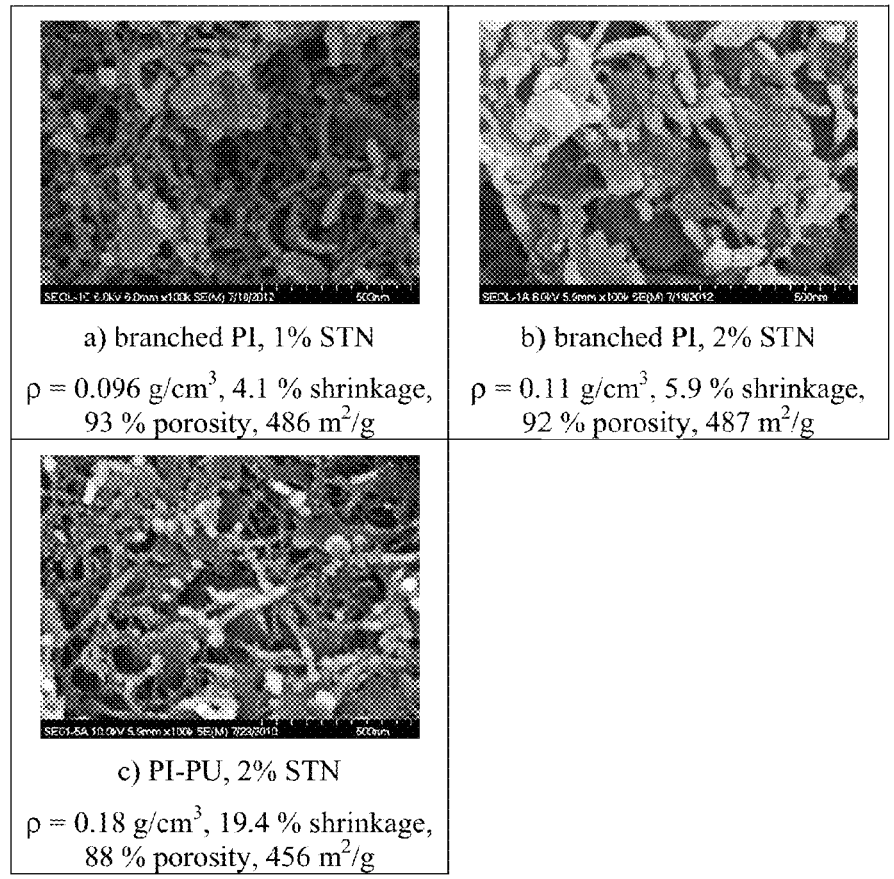
FIG. 9 shows SEM images of branched PIs and PI-PUs, with STN clay, prepared via thermal imidization, and having the following properties: (a) branched PI, 1% STN, $\rho$=0.096 g/cm$^3$, 4.1% shrinkage, 93% porosity, surface area of 486 m$^2$/g; (b) branched PI, 2% STN, $\rho$=0.11 g/cm$^3$, 5.9% shrinkage, 92% porosity, surface area of 487 m$^2$/g; and (c) PI-PU, 2% STN, $\rho$=0.18 g/cm$^3$, 19.4% shrinkage, 88% porosity, surface area of 456 m$^2$/g.

As mentioned earlier, smectite clay was also used in an attempt to improve the properties of the aerogels, especially thin film aerogels. The inclusion of the STN clay in aerogels with n of 3, non-urea-cross-linked PI and urea-cross-linked PI-PU, was studied. For branched PIs, there appeared to be a small difference in physical properties (albeit potentially representing error in measurements) of aerogels between 0 and 1 wt % of the clay (samples 1 and 7), yet improved modulus was seen in the presence of the clay (TABLE 1). Under scanning electron microscopy ("SEM"), agglomerations of clay were observed throughout the specimen (FIG. 9 (*a, b*)). The morphology suggested the existence of strong interaction between the clay plates and the polymer (FIG. 9).

For PI-PU, only 2 wt % of this Lucentite clay was investigated. The PI-PU aerogels with Lucentite STN at 2 wt % had slightly lower density, a slight decrease in the compressive modulus, and lower shrinkage, when compared to the non-clay counterpart (Samples 9 and 5). SEM image of sample 9 (FIG. 9 (c)) showed similar characteristics as those seen in samples 7 and 8. Slight increases in percent porosity and BET surface area were observed. A decrease in compressive modulus only is correlated with lower density.

Figure 11:
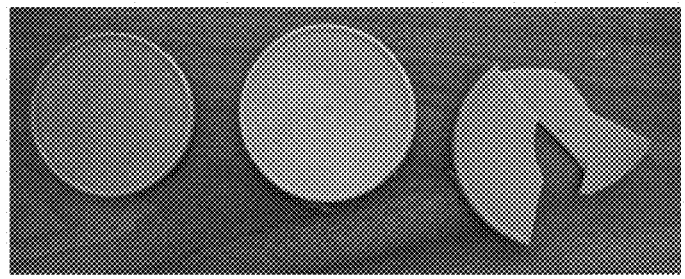
FIG. 11 shows physical appearances of aerogel disks, as follows: (a) PI-PU without clay (sample 5); (b) PI-PU with 2 wt % clay (sample 9); and (c) PI with 2 wt % clay (sample 8).
Figure 12:
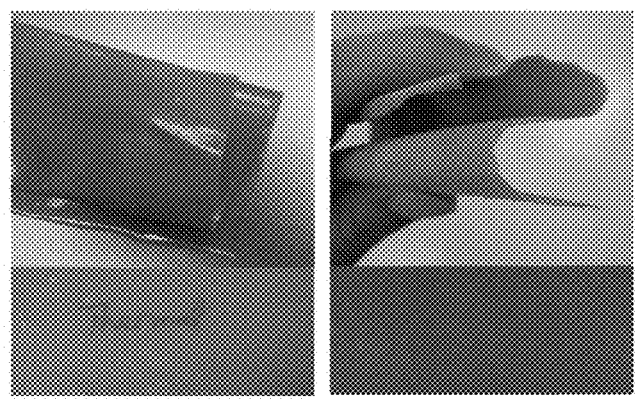
FIG. 12 shows photos of PI-PU aerogel films as follows: (a) PI-PU aerogel without clay (sample 5); and (b) PI-PU aerogel with 2 wt % clay (sample 9).

The extension of polyimide with urea links also allowed thin aerogel films to be cast. Pictures of aerogel disks are provided (FIG. 11 (a-c)). PI-PU aerogels, without clay and with 2 wt % clay (samples 5 and 9, respectively), were flexible and easy to handle. In contrast, PI aerogel without urea cross-links having 2 wt % clay (sample 8) was fragile and difficult to demold without breaking. Aerogel films cast from samples 5 and 9 are also shown (FIG. 12 (a, b)). Although monoliths obtained from sample 9 exhibited an improvement in density, shrinkage, porosity and BET surface area, the film was not transparent and less flexible as the sheet could not completely be folded (FIG. 12 (b)). Additionally, the film color across the aerogel sheet was non-uniform, an indication that the clay particles were not well dispersed. The film with the clay (sample 9) exhibited reductions in tensile modulus, strength and percent elongation (TABLE 1).

Different characteristics were obtained for aerogels prepared from the chemical imidization. Being imidized at room temperature, the gelation point occurred at much longer time as the viscosity of the sols slowly built up. In this study, PI-PU aerogels with n values of 3 to 15 were fabricated. With MDI being fully consumed by the BAPP at the beginning, reaction with water evolved from imidization is eliminated. Under measured amounts of MDI, trends in characteristics and properties could be more easily followed.

Figure 13:
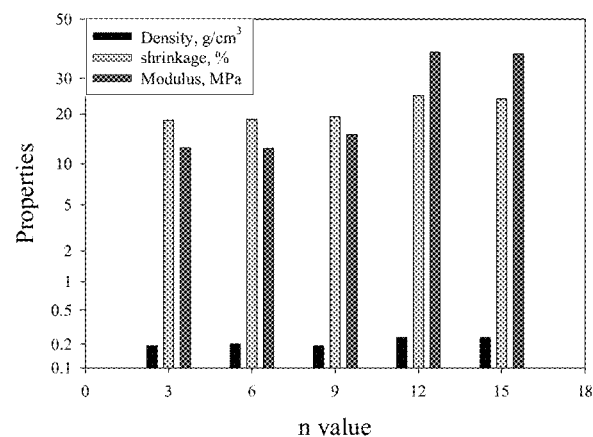
FIG. 13 provides graphs of properties of PI-PU aerogels made by chemical imidization, as follows: (a) n value vs. density, shrinkage, and modulus; and (b) n value vs. BET surface area.
Figure 13:
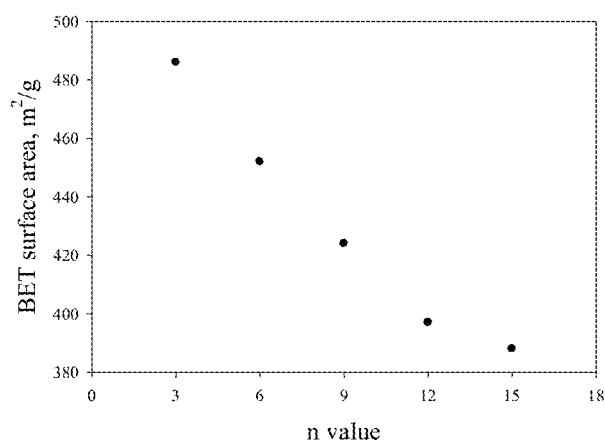
Figure 14:
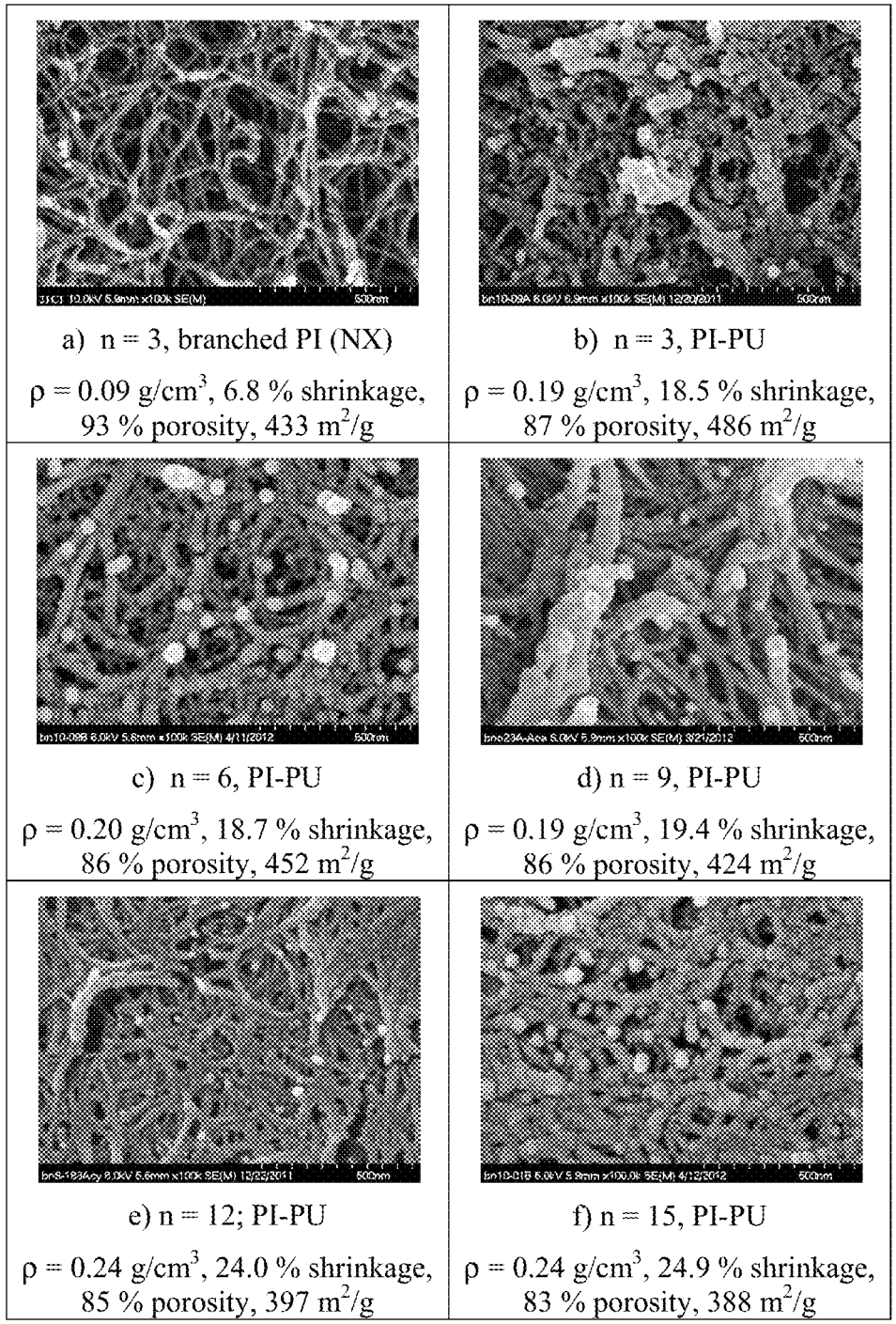
FIG. 14 shows SEM images of branched PIs and PI-PUs, prepared via chemical imidization, as follows: (a) n=3, branched PI, $\rho$=0.09 g/cm$^3$, 6.8% shrinkage, 93% porosity, surface area of 433 m$^2$/g; (b) n=3, PI-PU, $\rho$=0.19 g/cm$^3$, 18.5% shrinkage, 87% porosity, surface area of 486 m$^2$/g; (c) n=6, PI-PU, $\rho$=0.20 g/cm$^3$, 18.7% shrinkage, 86% porosity, surface area of 452 m$^2$/g; (d) n=9, PI-PU, $\rho$=0.19 g/cm$^3$, 19.4% shrinkage, 86% porosity, surface area of 424 m$^2$/g; (e) n=12; PI-PU, $\rho$=0.24 g/cm$^3$, 24.0% shrinkage, 85% porosity, surface area of 397 m$^2$/g; (f) n=15, PI-PU, $\rho$=0.24 g/cm$^3$, 24.9% shrinkage, 83% porosity, surface area of 388 m$^2$/g.

Physical and mechanical properties of aerogels made via thermal imidization were affected by the reaction of excess MDI and water-by product from imidization. More MDI resulted in higher density, shrinkage and modulus and lower percent porosity and BET surface area. Using chemical imidization, in contrast, the length of the polyimide chain has a dominant effect on properties of the final species. Graphs of density, percent shrinkage, and modulus and BET surface area as functions of n value are shown (FIG. 13 (a, b)). This trend could also be seen through SEM images (FIG. 14 (b-f)). Higher n values consequently led to denser structures.

Figure 15:
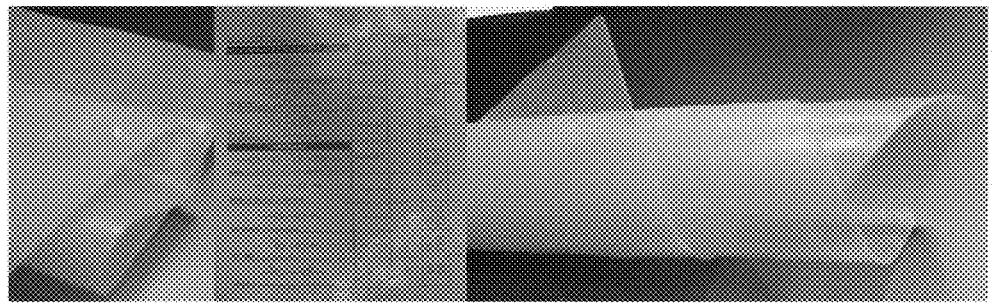
FIG. 15 shows photos of PI-PU aerogel film with n of 9, prepared via chemical imidization.
Figure 16:
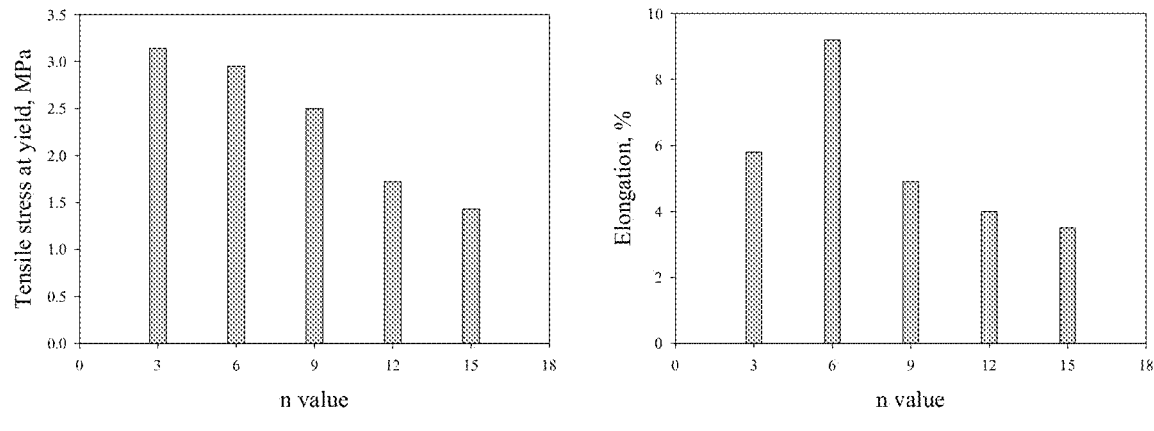
FIG. 16 shows graphs of properties of PI-PU films, prepared via chemical imidization, as follows: a) n value vs. tensile properties and b) n value vs. percent elongation.
Figure 17:
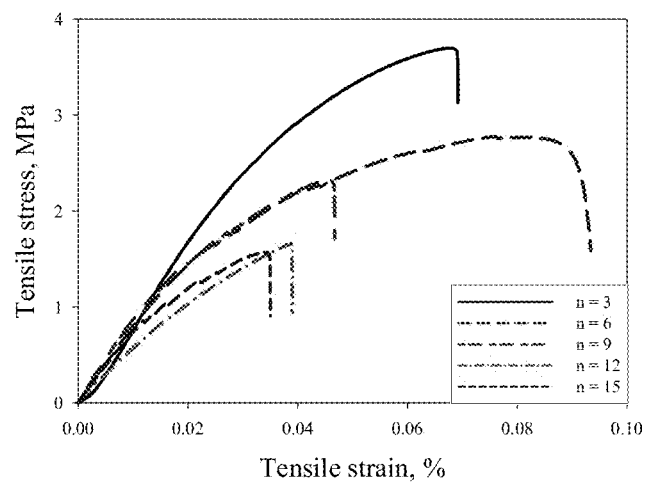
FIG. 17 shows a graph of tensile stress (MPa) vs. tensile strain (%) of PI-PU films prepared via chemical imidization.

PI-PU aerogel thin films cast with n value ranging from 3 to 15 were bright yellow and transparent (FIG. 15) and exhibited tensile properties and percentage elongation as shown (FIG. 16). They all were flexible. Though addition of urea links in the PI-PU network led to higher shrinkage compared to its PI counterpart, they improve the flexibility of the resulting aerogels as thin film could be cast. As previously pointed out, sample 12 exhibited an exceptional behavior such that its extension was the highest among all (FIG. 17).

Figure 18:
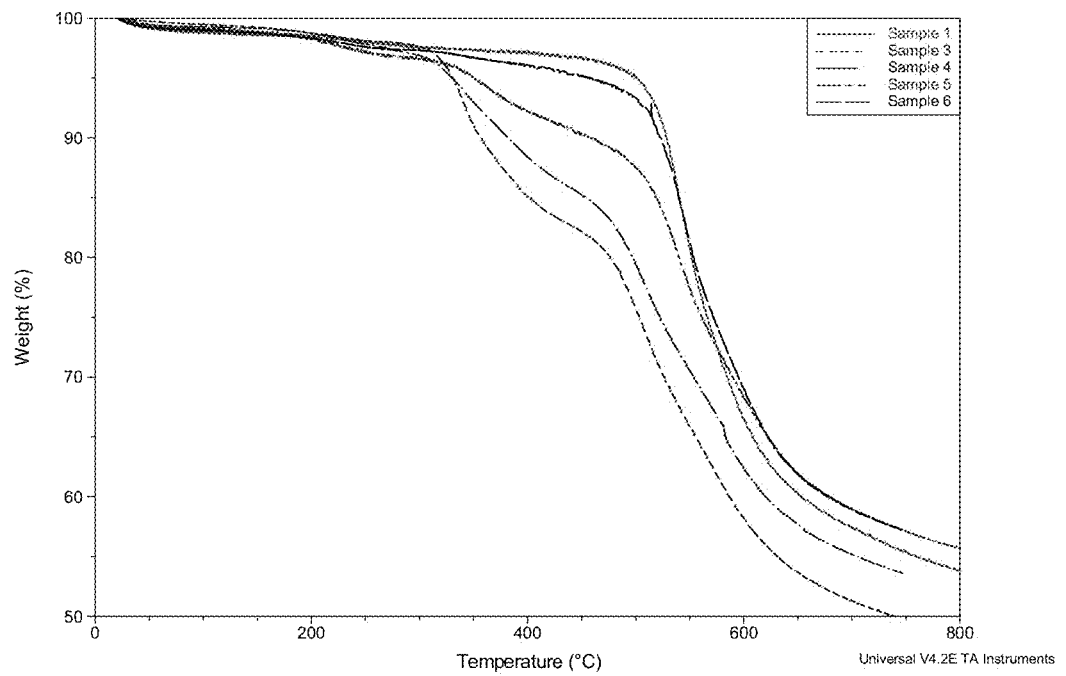
FIG. 18 shows thermal gravitational analysis curves of branched PI and PI-PU aerogels, prepared as follows: (a) thermal imidization; and b) chemical imidization.
Figure 18:
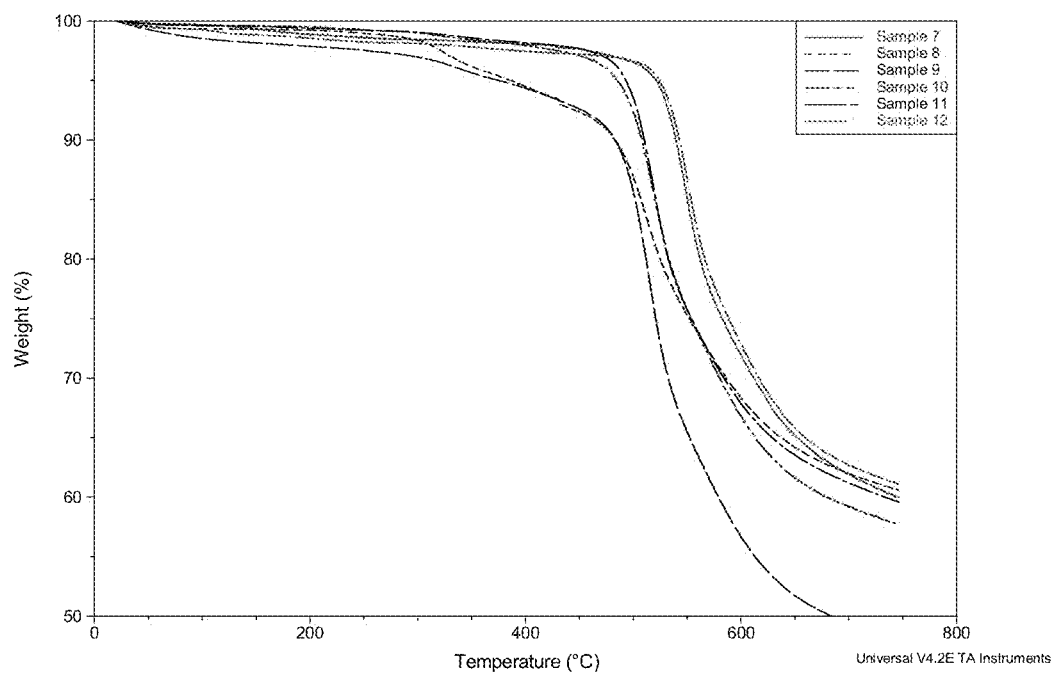

Thermal Properties. Thermal stability of the aerogels was evaluated using thermal gravimetric analysis ("TGA") under nitrogen. Although there was no detection of water from Fourier transform infrared spectroscopy ("FTIR"), about 0.5-2.0% of weight loss was measured at 200° C. for all samples. This small change in weight was probably due to the water moisture absorbed on the aerogel surface. Continuous slight decrease in weight after 200° C. was probably from residual NMP or further imidization from remaining polyamic acid. TGA thermograms of branched PI and PI-PU aerogels are shown (FIG. 18(a, b)). Branched PIs with no PU, samples 1 and 10 (with n of 3), had onsets of decomposition above 500° C.

Figure 19:
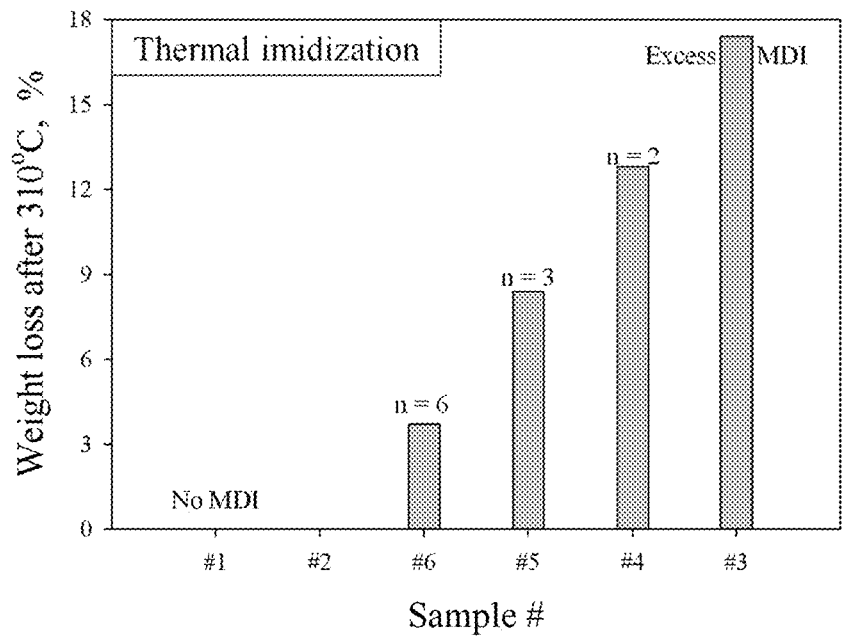
FIG. 19 shows graphs of percent weight loss after 310° C. for PI and PI-PU aerogels, prepared as follows: (a) thermal imidization; and b) chemical imidization.
Figure 19:
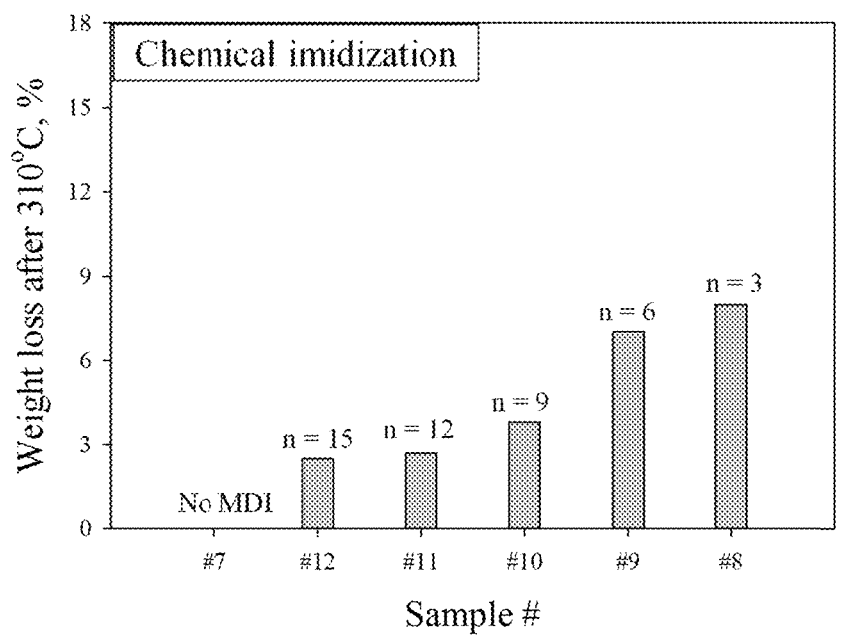

For the PI-PU aerogels, there were two thermal decomposition stages. The first stage had an onset of 310° C. ($T_{d1}$), suggesting the decomposition of the urea linkages. The difference in percent weight loss ($\Delta_{WL}$) was also found to be correlated to the amount of the MDI added as reported in TABLE 3 and TABLE 4 and as shown (FIG. 19(a, b)). The second decomposition stage began from 469° C. to 512° C. ($T_{d2}$), depending on the n value or the MW of the polyimide chains, corresponding to the decomposition of the imide groups. As the chain length of the polyimide segment increased, $T_{d2}$ of the aerogel network increased. It was noted that higher $T_{d2}$ was obtained for the PI-PU aerogels made via thermal imidization. Overall, the incorporation of MDI, or the existence of urea groups, in the network clearly had a great impact on the $T_{d2}$. For instance, the imide-urea hybrid aerogels formulated with n of 3 obviously displayed much lower Td2 compared to their imide only counterparts. Higher concentration of urea groups resulted in lower thermal stability of the end products (TABLE 3 and TABLE 4).

Conclusions. Polyimide-urea aerogels of different molecular weights were prepared via thermal and chemical imidization methods, 1 and 2, respectively. Thin films of certain formulations were also cast. Their physical and mechanical properties were measured, and they were subject to analyses including BET, SEM, FTIR, and TGA. Under the same n value of 3, a general trend shows that the incorporation of the urea bonds in the three-dimensional network was the cause for the pores to collapse, leading to higher shrinkage, higher density, and higher compressive modulus when compared to their non-urea cross-linked PI counterparts. With increasing addition of excess MDI, denser structures could be seen using SEM images. In addition, the percent weight loss between the $T_{d1}$ at 310° C. and $T_{d2}$ appeared to proportionally correlate to the amount of MDI added.

Regardless of the method used, due to the brittleness of the branched PI, only PI-PU films were cast and evaluated. Using thermal imidization, gel formed fairly quickly (1 to 4 min) as the temperature of the solution was allowed to drop below 100° C., depending on the n value formulated, leaving a small window of processing. Lucentite STN clay was also incorporated in both the branched PI and the PI-PU aerogels in an attempt to enhance their overall properties. It was observed that the organic clay improved the compressive modulus of the non-urea-cross-linked PI aerogel while maintaining relatively similar physical properties such as density, percent shrinkage, percent porosity, and BET surface area. Compared to the native PI-PU, film cast having the STN clay was less flexible and easily cracked.

Using the chemical imidization reaction method, longer $T_{gel}$ (about 50 min) allowed better control in solution viscosity, preparation, and casting. All formulations with n ranging from 3 to 15 were processed into thin films among which, formulation with n of 6 exhibited highest percent elongation under tensile stress, suggesting it to be the most flexible film among those cast. Within the PI-PU formulations, higher n value, or less MDI relative to PI segments, led to higher shrinkage and density, indicating that the length of the polyimide, or amount of cross-linking sites, in this study greatly affected physical properties.

TABLE 1

Preparation methods and properties of star-branched (non-urea-cross-linked) polyimide and urea-cross-linked polyimide-urea aerogels, prepared via thermal imidization reaction.

| Sample # | MDI | n value | Density (g/cm³) | Shrinkage % | Porosity % | BET m²/g | Modulus (Mpa) | Tensile stress at yield (Mpa) | Elongation % | Gelation time (min) | STN clay % | Equation # |
|---|---|---|---|---|---|---|---|---|---|---|---|---|
| 1 | no | 3 | 0.098 | 4.3 | 93 | 476 | 4.8 | — | — | 3 | 0 | 2 |
| 2 | yes | | | | | No gelation | | | | NA | | 3 |
| 3 | | | 0.22 | 22.2 | 83 | 366 | 31.6 | — | — | Overnight | | 4 |
| 4 | yes | 2 | 0.16 | 16.1 | 88 | 461 | 12.2 | — | — | 1-2 | | 5 |
| 5 | | 3 | 0.20 | 21.7 | 86 | 444 | 20.9 | 6.30 | 2.3 | 4 | | |
| 6 | | 6 | 0.13 | 8.9 | 89 | 541 | 6.9 | — | — | 1 | | |
| 7 | no | 3 | 0.096 | 4.1 | 93 | 486 | 7.1 | — | — | 3 | 1 | 2 |
| 8 | | | 0.11 | 5.9 | 92 | 487 | 7.4 | — | — | 3 | 2 | |
| 9 | yes | | 0.18 | 19.4 | 88 | 456 | 17.1 | 3.56 | 2.0 | 4 | 2 | 5 |

TABLE 2

Preparation methods and properties of star-branched (non-urea-cross-linked) polyimide and urea-cross-linked polyimide-urea aerogels, prepared via chemical imidization reaction.

| Sample # | MDI | n value | Density (g/cm³) | Shrinkage % | Porosity % | BET m²/g | Modulus (Mpa) | Tensile stress at yield (Mpa) | Elongation % | Gelation time (min) | Equation # |
|---|---|---|---|---|---|---|---|---|---|---|---|
| 10 | no | 3 | 0.86 | 6.8 | 93 | 433 | 2.8 | — | — | >2 hours | 2 |
| 11 | yes | 3 | 0.19 | 18.5 | 87 | 486 | 12.4 | 3.14 | 5.8 | 50 | 3 |
| 12 | yes | 6 | 0.20 | 18.7 | 86 | 452 | 12.6 | 2.95 | 9.2 | 50 | |
| 13 | yes | 9 | 0.19 | 19.4 | 83 | 424 | 19.8 | 2.50 | 4.9 | 50 | |
| 14 | yes | 12 | 0.20 | 24.0 | 85 | 388 | 38.5 | 1.72 | 4.0 | 50 | |
| 15 | yes | 15 | 0.20 | 24.9 | 83 | 397 | 37.9 | 1.43 | 3.5 | 50 | |

TABLE 3

Thermal properties of branched (non-urea-cross-linked) polyimide and urea-cross-linked polyimide-urea aerogels, prepared via thermal imidization reaction.

| Sample # | MDI | n value | ΔWL after 310° C. ($T_{d1}$) % | $T_{d2}$ ° C. | Total wt loss after 200° C. |
|---|---|---|---|---|---|
| 1 | no | 3 | NA | 501 | 3.4 |
| 3 | yes | | 17.6 | 476 | 19.0 |
| 4 | yes | 2 | 12.8 | 469 | 14.9 |
| 5 | yes | 3 | 8.6 | 497 | 10.4 |
| 6 | yes | 6 | 4.5 | 498 | 5.5 |

TABLE 4

Thermal properties of branched (non-urea-cross-linked) polyimide and urea-cross-linked polyimide-urea aerogels, prepared via chemical imidization reaction.

| Sample # | MDI | n value | ΔWL after 310° C. ($T_{d1}$) % | $T_{d2}$ ° C. | Total wt loss after 200° C. |
|---|---|---|---|---|---|
| 10 | no | 3 | NA | 520 | 1.2 |
| 11 | yes | 3 | 7.5 | 477 | 8.6 |
| 12 | yes | 6 | 6.5 | 481 | 7.6 |
| 13 | yes | 9 | 3.7 | 483 | 4.3 |
| 14 | yes | 12 | 2.4 | 484 | 2.6 |
| 15 | yes | 15 | 2.0 | 512 | 2.5 |

What is claimed is:

1. A porous cross-linked polyimide-urea network comprising a subunit comprising two anhydride end-capped polyamic acid oligomers in direct connection via a urea linkage, wherein:

(i) the oligomers (a) each comprise a repeating unit of a dianhydride and a diamine and a terminal anhydride group and (b) are formulated with 2 to 15 of the repeating units;

(ii) the subunit was formed by reaction of the diamine and a diisocyanate to form a diamine-urea linkage-diamine group, followed by reaction of the diamine-urea linkage-diamine group with the dianhydride and the diamine to form the subunit;

(iii) the subunit has been cross-linked via a cross-linking agent, comprising three or more amine groups, at a balanced stoichiometry of the amine groups to the terminal anhydride groups; and (iv) the subunit has been chemically imidized to yield the porous cross-linked polyimide-urea network.

2. The network of claim 1, wherein the dianhydride is selected from the group consisting of benzophenone-3,3',4,4'-tetracarboxylic dianhydride, 2,2'-bis (3,4'-dicarboxyphenyl) hexafluoropropane dianhydride, and biphenyl-3,3',4,4'-tetracarboxylic dianhydride.

3. The network of claim 1, wherein the diamine is selected from the group consisting of 2,2'-bis[4-(4-aminophenoxy)phenyl]propane, 3,4'-oxydianiline, 4,4'-oxydianiline, p-phenylene diamine, 2,2'-dimethylbenzidine, bisaniline-p-xylidene, 4,4'-bis(4-aminophenoxy) biphenyl, 3,3'-bis(4-aminophenoxy)biphenyl, 4,4'-(1,4-phenylenediisopropylidene)bisaniline, and 4,4'-(1,3-henylenediisopropylidene) bisaniline.

4. The network of claim 1, wherein the oligomers are formulated with 4 to 9 of the repeating units.

5. The network of claim 1, wherein the oligomers are formulated with 5 to 7 of the repeating units.

6. The network of claim 1, wherein the cross-linking agent is selected from the group consisting of a triamine, an aliphatic triamine, an aromatic triamine, 1,3,5-tri(4-aminophenoxy)benzene, a silica cage structure decorated with three or more amines, octa(aminophenyl)silsesquioxane, octa(aminophenyl)silsesquioxane as a mixture of isomers having the ratio meta:ortho:para of 60:30:10, and para-octa(aminophenyl)silsesquioxane.

7. The network of claim 1, wherein the subunit has been chemically imidized to completion.

8. A wet gel comprising the network of claim 1.

9. An aerogel comprising the network of claim 1.

10. An aerogel comprising the network of claim 1, wherein the aerogel was obtained by supercritical fluid extraction.

11. An aerogel comprising the network of claim 1, wherein the aerogel has a density of 0.18 to 0.21 g/cm$^3$.

12. An aerogel comprising the network of claim 1, wherein the aerogel has a porosity of 80 to 90%.

13. An aerogel comprising the network of claim 1, wherein the aerogel has a Young's modulus of 10 to 40 MPa.

14. An aerogel comprising the network of claim 1, wherein the weight loss of the aerogel following heating of the network at 310° C. is less than 10%.

15. A thin film comprising the network of claim 1.

16. A thin film comprising the network of claim 1, wherein the oligomers are formulated with 5 to 7 of the repeating units.

17. A thin film comprising the network of claim 1, wherein the thin film has sufficient flexibility to be rolled or folded and then recover completely without cracking or flaking.

18. A thin film comprising the network of claim 1, wherein the thin film has a tensile strength at yield of 1.0 to 3.5 MPa.

19. A method of making the porous cross-linked polyimide-urea network of claim 1, the method comprising:
 (i) reacting the diamine and the diisocyanate to form the diamine-urea linkage-diamine group;
 (ii) reacting the diamine-urea linkage-diamine group with the dianhydride and the diamine to form the subunit;
 (iii) cross-linking the subunit with the cross-linking agent, comprising three or more amine groups, at a balanced stoichiometry of the amine groups to the terminal anhydrides; and
 (iv) chemically imidizing the subunit with an imidization catalyst to yield the porous cross-linked polyimide-urea network.

20. The method of claim 19, wherein the dianhydride is selected from the group consisting of benzophenone-3,3',4,4'-tetracarboxylic dianhydride, 2,2'-bis (3,4'-dicarboxyphenyl) hexafluoropropane dianhydride, and biphenyl-3,3',4,4'-tetracarboxylic dianhydride.

21. The method of claim 19, wherein the diamine is selected from the group consisting of 2,2'-bis[4-(4-aminophenoxy)phenyl]propane, 3,4'-oxydianiline, 4,4'-oxydianiline, p-phenylene diamine, 2,2'-dimethylbenzidine, bisaniline-p-xylidene, 4,4'-bis(4-aminophenoxy)biphenyl, 3,3'-bis(4-aminophenoxy)biphenyl, 4,4'-(1,4-phenylenediisopropylidene)bisaniline, and 4,4'-(1,3-phenylenediisopropylidene)bisaniline.

22. The method of claim 19, wherein the oligomers are formulated with 4 to 9 of the repeating units.

23. The method of claim 19, wherein the oligomers are formulated with 5 to 7 of the repeating units.

24. The method of claim 19, wherein the cross-linking agent is selected from the group consisting of a triamine, an aliphatic triamine, an aromatic triamine, 1,3,5-tri(4-aminophenoxy) benzene, a silica cage structure decorated with three or more amines, octa(aminophenyl)silsesquioxane, octa(aminophenyl)silsesquioxane as a mixture of isomers having the ratio meta:ortho:para of 60:30:10, and para-octa (aminophenyl)silsesquioxane.

25. The method of claim 19, wherein the subunit has been chemically imidized to completion.

26. The method of claim 19, wherein the imidization catalyst comprises acetic anhydride and pyridine.

27. A porous cross-linked polyimide-urea aerogel comprising a cross-linked and imidized subunit comprising two anhydride end-capped polyamic acid oligomers in direct connection via a urea linkage, wherein the oligomers (a) each comprise a repeating unit of a dianhydride and a diamine and a terminal anhydride group and (b) are formulated with 2 to 15 of the repeating units, and the aerogel has a density of 0.18 to 0.21 g/cm$^3$ and a Young's modulus of 10 to 40 MPa.

28. The aerogel of claim 27, wherein the dianhydride is benzophenone-3,3', 4,4'-tetracarboxylic dianhydride, and the diamine is 2,2'-bis[4-(4-aminophenoxy)phenyl]propane.

29. The aerogel of claim 27, wherein the aerogel has a porosity of 80 to 90%.

30. The aerogel of claim 27, wherein the aerogel has a BET surface area of 350 to 500 m$^2$/g.

31. The aerogel of claim 27, wherein the weight loss of the aerogel following heating of the network at 310° C. is less than 10%.

32. A thin film comprising the aerogel of claim 27.

33. The thin film of claim 32, wherein the thin film has sufficient flexibility to be rolled or folded and then recover completely without cracking or flaking.

34. The thin film of claim 32, wherein the thin film has a tensile strength at yield of 1.0 to 3.5 MPa.

* * * * *

UNITED STATES PATENT AND TRADEMARK OFFICE
CERTIFICATE OF CORRECTION

PATENT NO.        : 8,974,903 B2
APPLICATION NO.   : 13/804546
DATED             : March 10, 2015
INVENTOR(S)       : Mary Ann B. Meador and Baochau N. Nguyen It is certified that error appears in the above-identified patent and that said Letters Patent is hereby corrected as shown below:

In the Claims

Column 18, lines 60-61, Claim 3, the text "4,4'-(1,3-henylenediisopropylidene)" should read --4,4'-(1,3-phenylenediisopropylidene)--.

Signed and Sealed this
Twenty-fifth Day of August, 2015

Michelle K. Lee
*Director of the United States Patent and Trademark Office*